United States Patent
Ikebe et al.

(10) Patent No.: US 9,097,597 B2
(45) Date of Patent: *Aug. 4, 2015

(54) DETECTION DEVICE, ELECTRONIC APPARATUS, AND ROBOT

(71) Applicant: SEIKO EPSON CORPORATION, Tokyo (JP)

(72) Inventors: Tomo Ikebe, Suwa (JP); Sumio Utsunomiya, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,845

(22) Filed: Mar. 25, 2014

(65) Prior Publication Data

US 2014/0202259 A1     Jul. 24, 2014

Related U.S. Application Data

(63) Continuation of application No. 13/299,641, filed on Nov. 18, 2011, now Pat. No. 8,800,385.

(30) Foreign Application Priority Data

Dec. 8, 2010   (JP) .................................. 2010-273261

(51) Int. Cl.
*G01D 7/00* (2006.01)
*G01L 1/04* (2006.01)
*G01L 5/22* (2006.01)
*G01L 1/20* (2006.01)

(Continued)

(52) U.S. Cl.
CPC ................. *G01L 1/04* (2013.01); *B25J 13/085* (2013.01); *G01L 1/20* (2013.01); *G01L 1/205* (2013.01); *G01L 5/161* (2013.01); *G01L 5/228* (2013.01); *G06F 3/0338* (2013.01); *G06F 3/03547* (2013.01); *G06F 3/0414* (2013.01); *Y10S 901/46* (2013.01)

(58) Field of Classification Search
CPC ......... G01L 1/205; G01L 5/161; G01L 5/228; G01L 1/04; G06F 3/03547; G06F 3/0414
USPC ........ 73/862.041–862.046, 862.381, 862.391
See application file for complete search history.

(56) References Cited

U.S. PATENT DOCUMENTS 5,490,421 A    2/1996  Ueyanagi
5,986,221 A    11/1999 Stanley (Continued)

FOREIGN PATENT DOCUMENTS

CN       102037340 A    4/2011
JP       A-60-135834    7/1985

(Continued)

OTHER PUBLICATIONS

U.S. Appl. No. 13/299,641, filed Nov. 18, 2011, Tomo Ikebe et al.

*Primary Examiner* — Max Noori
(74) *Attorney, Agent, or Firm* — Oliff PLC

(57) ABSTRACT

A detection unit includes a sensor that detects the presence of force and a force component separation mechanism that separates the magnitude and the direction of the force and a control unit that controls the detection action of the force component separation mechanism based on the detection result of the sensor.

20 Claims, 18 Drawing Sheets

(51) Int. Cl.
*G01L 5/16* (2006.01)
*G06F 3/0338* (2013.01)
*G06F 3/041* (2006.01)
*G06F 3/0354* (2013.01)
*B25J 13/08* (2006.01)

(56) References Cited

U.S. PATENT DOCUMENTS

| | | | |
|---|---|---|---|
| 6,109,117 A | 8/2000 | Stanley et al. | |
| 6,889,565 B2 | 5/2005 | DeConde et al. | |
| 2004/0046574 A1* | 3/2004 | Chou | 324/658 |
| 2007/0040107 A1 | 2/2007 | Mizota et al. | |
| 2011/0043491 A1* | 2/2011 | Oh | 345/177 |
| 2011/0067504 A1 | 3/2011 | Koyama et al. | |
| 2012/0072131 A1 | 3/2012 | Ikebe | |
| 2012/0096952 A1* | 4/2012 | Amano et al. | 73/862.046 |
| 2012/0144932 A1 | 6/2012 | Ikebe et al. | |

FOREIGN PATENT DOCUMENTS

| | | |
|---|---|---|
| JP | A-7-128163 | 5/1995 |
| JP | A-2007-518966 | 7/2007 |
| JP | A-2008-164557 | 7/2008 |
| WO | WO 2005/029028 A1 | 3/2005 |

\* cited by examiner

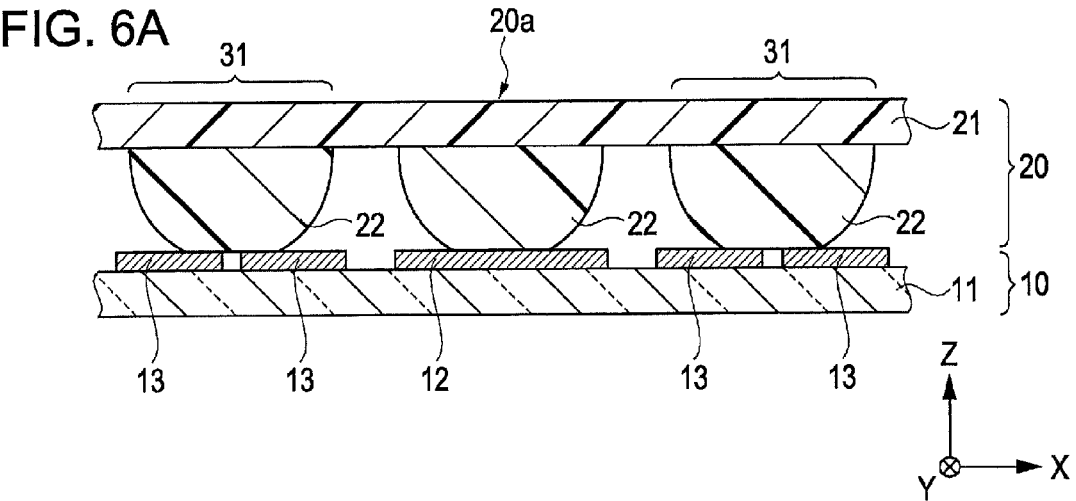
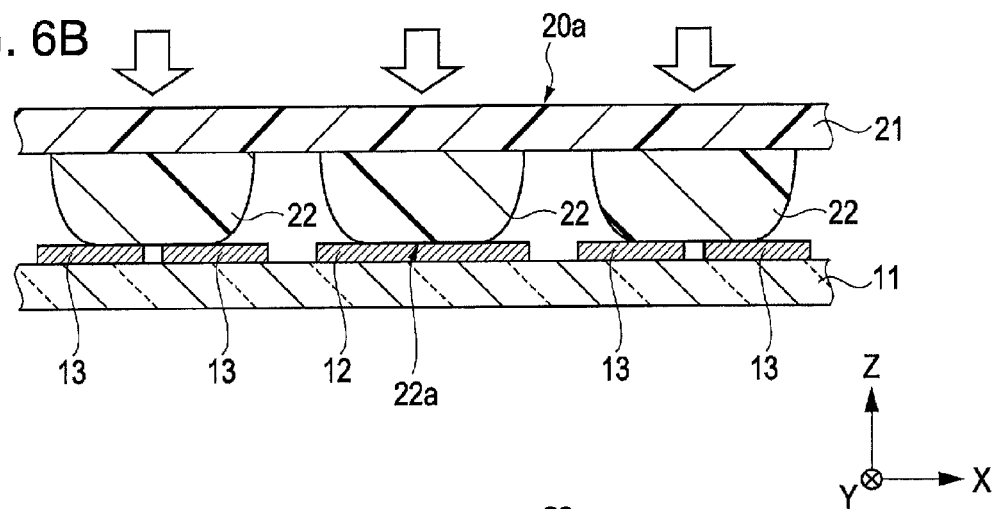
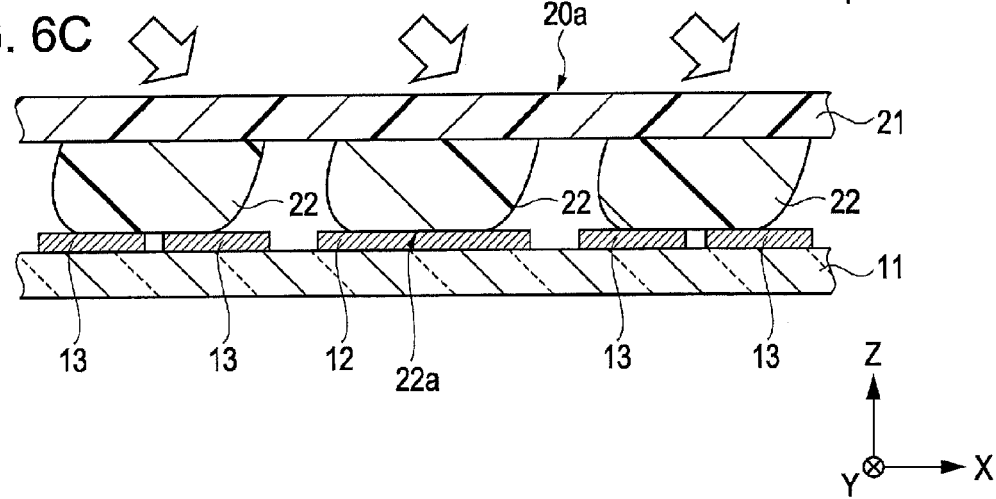

DETECTION DEVICE, ELECTRONIC APPARATUS, AND ROBOT

This application is a continuation of application Ser. No. 13/299,641 filed Nov. 18, 2011, which claims priority to Japan Patent Application No. 2010-273261, filed Dec. 8, 2010, the contents of which are incorporated herein by reference in their entirety.

BACKGROUND

1. Technical Field

The present invention relates to a detection device, an electronic apparatus including the detection device, and a robot.

2. Related Art

The detection devices described in JP-A-60-135834 and JP-A-2008-164557 are known detection devices which detect an external force. The application of such detection devices to touch panels, contact sensors on robots, and the like is being investigated.

The detection device of JP-A-60-135834 has a configuration of using a force receiving sheet, on the back face of which conic protrusions are arranged substantially evenly, and detecting force distribution from the transformation amounts of the protrusions. The detection device of JP-A-2008-164557 includes contacts that are displaceable on the front face, and includes a plurality of force-sensitive elements that detect and output the displacements of the contacts using detection points.

However, with the detection device of JP-A-60-135834 described above, since the transformation amounts of the protrusions are computed from an image that is imaged by a camera, the computation amount is large and the time taken for force detection is long. Further, it is not possible to measure the force in the in-plane direction (slipping force) on the measurement face (back face) of the force receiving sheet.

With the detection device of JP-A-2008-164557, although it is possible to calculate the force in the in-plane direction (slipping force) on the measurement face (front face) by an operation, in a case when there are many detection points for each contact, the time taken to obtain the output value becomes long.

As described above, with the detection devices of JP-A-60-135834 and JP-A-2008-164557, there was a problem that neither could combine the function of detecting the presence of force quickly and the function of detecting the distribution or the direction and the magnitude of external force with high accuracy.

SUMMARY

An advantage of some aspects of the invention is that it is possible to realize the flowing embodiments and applications.

Application 1

A detection device according to the application includes: a detection unit that includes a first sensor that is provided on a first substrate and which detects the presence of force and a force component separation mechanism that separates the magnitude and the direction of the force; and a control unit that controls a detection action of the force component separation mechanism based on the detection result of the first sensor.

With such a configuration, the presence of force is detected by the first sensor, and since the force component separation mechanism respectively separates and detects the magnitude of the force or the like, compared to a case when detecting the presence of force with the entirety of the detection unit, it is possible to detect the presence of force quickly. Furthermore, after detecting the presence of force, by the control unit controlling to execute only the detection action of the force component separation mechanism, compared to the related art, the time taken to detect the magnitude of the force can be shortened.

Application 2

In the detection device according to the above application, it is preferable that the force component separation mechanism be arranged around a reference point on the first substrate, and be configured by a plurality of second sensors that detect the magnitude of force and an elastic protrusion that is provided on a second substrate that is arranged to face the first substrate and in which a front end portion abuts at a position that overlaps the reference point in plan view.

With such a configuration, if force is applied to the elastic protrusions in a state where the elastic protrusions abut the plurality of second sensors, by the elastic protrusion being transformed in the slipping direction (direction that is parallel to the front face of the force sensor) and the inclination of the transformation (deviation from the reference point) being detected by the plurality of second sensors, it is possible to detect the direction and the magnitude of the external force. Further, since there is a plurality of second sensors, it is possible to detect the distribution and the magnitude of the force with high precision.

Application 3

In the detection device according to the above applications, it is preferable that in a case when it is detected by the first sensor that there is force, the plurality of second sensors start detection of a force value by a signal from the control unit.

With such a configuration, since the presence of force and the magnitude and the direction of the force are respectively separated and detected by the first and second sensors, it is possible to shorten the time taken to detect the magnitude of the force compared to the related art.

Application 4

In the detection device according to the above applications, it is preferable that the first sensor be arranged between at least two force component separation mechanisms in plan view.

With such a configuration, since at least two force component separation mechanisms are included, it is possible to detect the direction or the rotation torque of the force.

Application 5

In the detection device according to the above applications, it is preferable that at least two force component separation mechanisms be arranged in the surroundings of the first sensor in plan view.

With such a configuration, since at least two force component separation mechanisms are included, it is possible to detect the direction or the rotation torque of the force.

Application 6

In the detection device according to the above applications, it is preferable that the plurality of second sensors be arranged to be point symmetrical with respect to the reference point.

With such a configuration, since the second sensors are arranged to be point symmetrical (even) with respect to the reference point, correction by the positional relationship between the second sensors and the elastic protrusion becomes unnecessary, and it is possible to detect the direction and the magnitude of the force by the difference in the detection values of the second sensors only. Further, by the second sensors being arranged in plurality, it is possible to detect the rotation torque with high precision.

Application 7

In the detection device according to the above applications, it is preferable that the plurality of second sensors be arranged in a matrix form in two directions that are orthogonal to each other in plan view.

With such a configuration, it is possible to operate the direction and the magnitude of the force from the difference of the force values of each of the second sensors which are combined arbitrarily out of the force values of each of the second sensors.

Application 8

In the detection device according to the above applications, it is preferable that the plurality of second sensors be arranged in at least four rows and four columns per unit detection region.

With such a configuration, since there are many second sensors, it is possible to ascertain the direction and the magnitude in which external force acts by integrating the detection results of each of the force sensors based on the force values detected by the many force sensors. It is therefore possible to detect the direction and the magnitude of the external force with high precision.

Application 9

In the detection device according to the above applications, it is preferable that the first sensor include a first electrode and a second electrode that are arranged to be opposed on the first substrate, the second sensor include a third electrode and a fourth electrode that are arranged to be opposed on the first substrate, and a force-sensitive conductor be arranged between at least the third electrode and the fourth electrode.

With such a configuration, since a force-sensitive conductor is interposed between at least the third electrode and the fourth electrode, when force is applied, it is possible to convert the force into an electric signal by compressing the force-sensitive conductor, and it is possible to detect the magnitude or the direction of the force. Further, with the first sensor, in a case when there is no force-sensitive conductor between the first electrode and the second electrode, it is possible for the first electrode to contact the second electrode even with weak force, and it is possible to obtain higher sensitivity than the second sensor even as the first sensor and the second sensor are on the same first substrate.

Application 10

In the detection device according to the above applications, it is preferable that an area in plan view of the first electrode of the first sensor be greater than an area in plan view of the third electrode of the second sensor.

With such a configuration, by the first sensor having a large area, when force is applied, there is a possibility that the resistance value when the first electrode and the second electrode contact via the force-sensitive conductor becomes smaller than the resistance value when the third electrode and the fourth electrode contact. It is therefore possible to raise the sensitivity of the first sensor.

Application 11

An electronic apparatus according to the application includes the detection device described above.

With such a configuration, since the detection device described above is included, it is possible to provide an electronic apparatus that is able detect the presence of external force quickly and to detect the direction and the magnitude of the external force with high precision.

Application 12

A robot according to the application includes the detection device described above.

With such a configuration, since the detection device described above is included, it is possible to provide a robot that is able to detect the presence of external force quickly and detect the direction and the magnitude of the external force with high precision.

BRIEF DESCRIPTION OF THE DRAWINGS

The invention will be described with reference to the accompanying drawings, wherein like numbers reference like elements.

FIGS. 6A to 6C are schematic cross-sectional diagrams that illustrate changes in the force (force component separation mechanism).

DESCRIPTION OF EXEMPLARY EMBODIMENTS

Embodiments into which the invention is materialized will be described below according to the drawings. Here, the drawings that are used are displayed by being scaled up or down as appropriate so that the portions to be described are able to be seen. Here, the detection device of the embodiments is a touchpad of a force sensor method which is able to direction the direction and the magnitude of the external force, and is used, for example, as a point device instead of a mouse in an electronic apparatus such as a notebook type personal computer (notebook computer).

Further, in the embodiments, "front face" of the first substrate refers to the plurality of force sensor formation faces on the first substrate. The "front face" of the second substrate refers to the opposite face of an elastic protrusion formation face on the second substrate, that is, refers to the face that receives external force.

Figure 2:
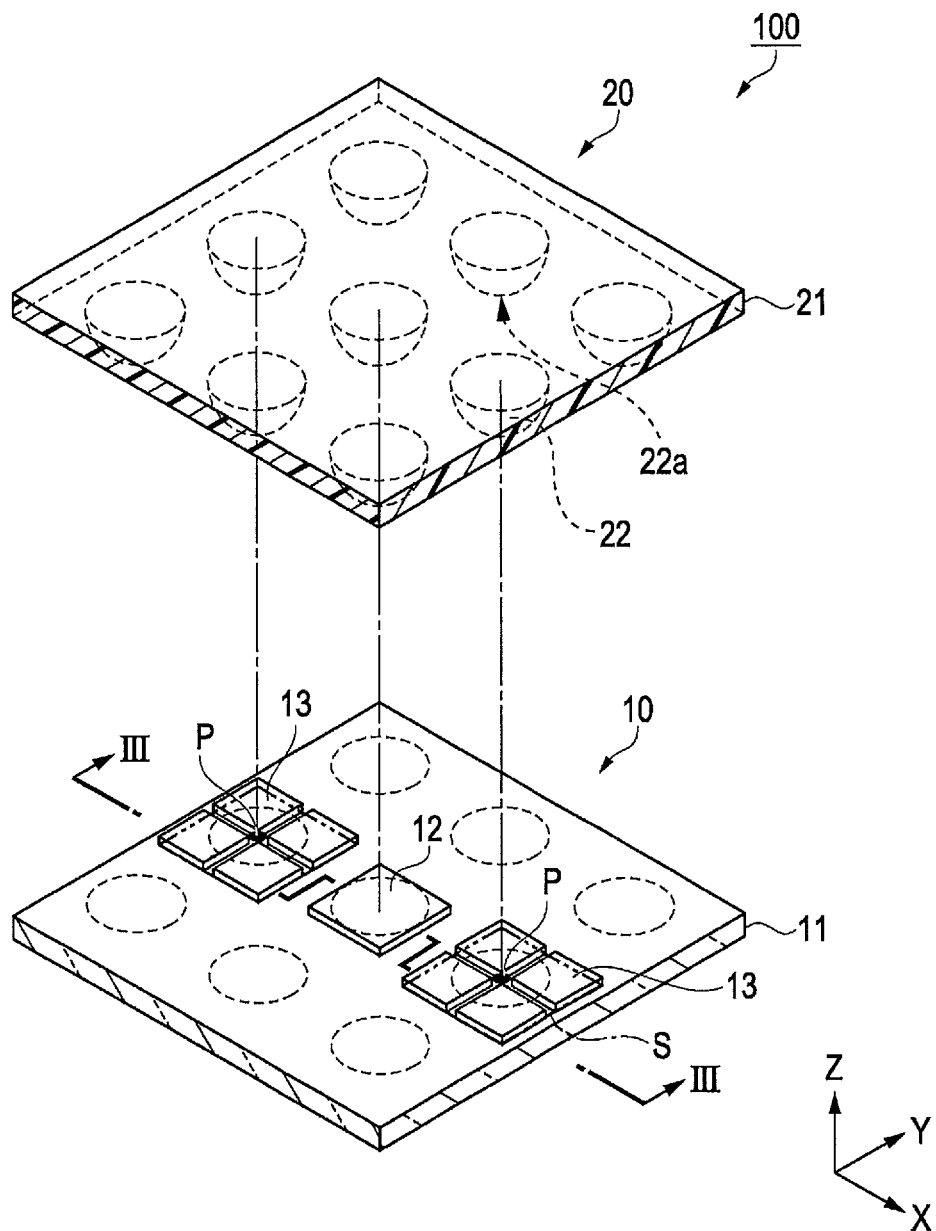
FIG. 2 is an exploded perspective diagram that illustrates a configuration of the detection device.

In the descriptions below, the XYZ orthogonal coordinate systems illustrated in FIG. 2 are set, and each member will be described with reference to the XYZ orthogonal coordinate systems. The XYZ orthogonal coordinate systems are set so that the X axis and the Y axis are in a direction that is parallel to a sensor substrate main body 11. The Z axis is set to a direction that is respectively orthogonal to the X axis and the Y axis, that is, in a normal vector direction with respect to the sensor substrate main body 11 as the first substrate.

First Embodiment
Configuration of Detection Device

Figure 1:
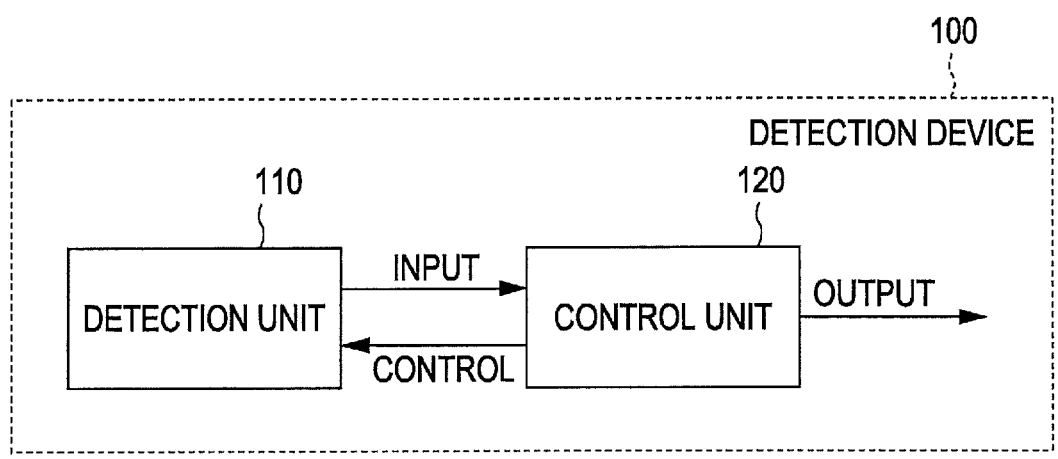
FIG. 1 is a block diagram that illustrates an electric configuration of a detection device of a first embodiment.

FIG. 1 is a block diagram that illustrates an electric configuration of a detection device. The electric configuration of the detection device will be described below with reference to FIG. 1.

As illustrated in FIG. 1, a detection device 100 includes a detection unit 110 and a control unit 120. The detection unit 110 includes a contact sensor 12 as the first sensor for detecting the presence of force (refer to FIG. 2) and force sensors 13 as the second sensors for detecting the magnitude of the force (refer to FIG. 2). Further, the information that is detected by the detection unit 110 is input to the control unit 120.

The control unit 120 performs the action of detecting the presence of external force by the contact sensor 12 and controls the next detection action of the force sensors 13 based on the detection result.

Figure 3:
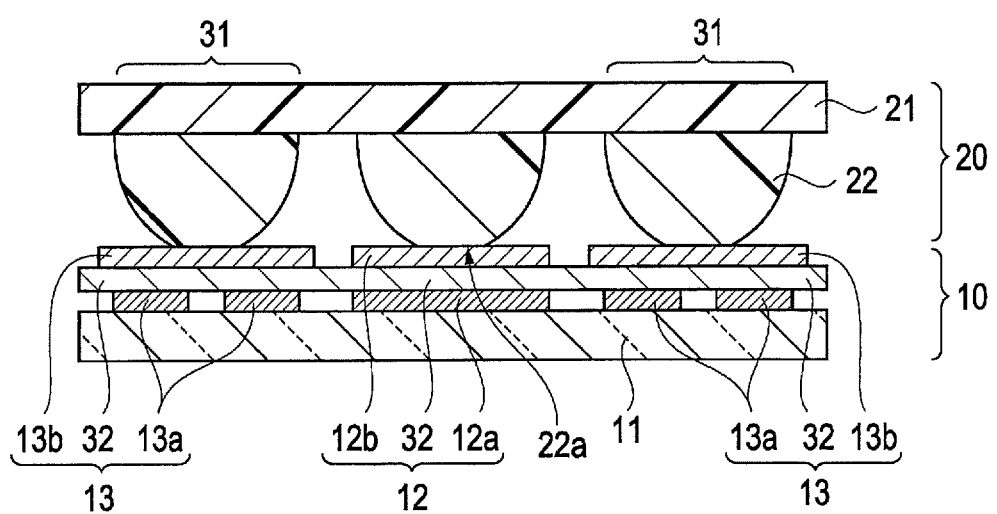
FIG. 3 is a schematic cross-sectional diagram along line of the detection device illustrated in FIG. 2.

FIG. 2 is an exploded perspective diagram that illustrates a configuration of the detection device. FIG. 3 is a schematic cross-sectional diagram along the line III-III of the detection device illustrated in FIG. 2. The configuration of the detection device will be described below with references to FIGS. 2 and 3.

In FIG. 2, the symbol P indicates the reference point and the symbol S indicates a unit detection region that the force sensors 13 that are arranged to correspond with one elastic protrusion 22 detect. Here, the "reference point" is a point at which the center (center of gravity) of the elastic protrusion 22 is positioned in plan view in a case when a slipping force is not acting.

As illustrated in FIG. 2, the detection device 100 includes a sensor substrate 10 as the first substrate and a protrusion sheet 20 that is arranged to face the sensor substrate 10. Specifically, the sensor substrate 10 has a plurality of force sensors 13 that are provided around the reference point P on a sensor substrate main body 11.

The protrusion sheet 20 has the elastic protrusions 22 of which the center of gravity is positioned at a position that overlaps the reference point P on a protrusion sheet main body 21 as the second substrate. The elastic protrusions 22 elastically transform in a state in which the front end portion abuts the sensor substrate 10 (contact sensor 12 and force sensors 13).

More specifically, the sensor substrate 10 is configured to include a rectangular plate-like sensor substrate main body 11 that is configured by materials such as, for example, glass, quartz, or plastic, a plurality of force sensors 13 that are arranged in a matrix shape on the sensor substrate main body 11, and the contact sensor 12 that is arranged between two unit detection regions S.

The plurality of force sensors 13 are arranged to be point symmetrical with respect to the reference point P. For example, the plurality of force sensors 13 are arranged in a matrix shape in two directions (X direction and Y direction) that are orthogonal to each other. The distance between the reference point P and each of the force sensors 13 thereby becomes equal to one another.

The relationship between the transformation of the elastic protrusions 22 and the force values that are detected by each of the force sensors 13 becomes equal to one another. Accordingly, it becomes easy to operate the difference in force values that are detected by each of the force sensors 13 which is combined arbitrarily out of the force values of each of the force sensors 13. Here, the operation method of the difference in force values will be described later.

As described above, the protrusion sheet 20 is configured to include the rectangular plate-like protrusion sheet main body 21 and the plurality of elastic protrusions 22 that are provided on the protrusion sheet main body 21.

The protrusion sheet main body 21 is a portion that directly receives external force. The protrusion sheet main body 21 may be configured by materials such as, for example, glass, quartz, or plastic, or may be configured by resin materials such as urethane foam resin or silicone resin. In the embodiment, a resin material is used as the formation material of the protrusion sheet main body 21 and the elastic protrusions 22, and the protrusion sheet main body 21 and the elastic protrusions 22 are integrally formed by a die.

The plurality of elastic protrusions 22 are arranged in a matrix shape in the X direction and the Y direction on the protrusion sheet main body 21. A front end portion 22a of an elastic protrusion 22 is, for example, a spindle shape of the spherical surface and abuts the sensor substrate 10.

Specifically, the center of gravity of the elastic protrusion 22 is arranged on a position that initially overlaps the reference point P in the unit detection region S. Furthermore, the centers of gravity of other elastic protrusions 22 are arranged on positions that overlap the center of gravity of the contact sensor 12.

Although the elastic protrusions 22 that contact the contact sensor 12 and the force sensors 13 have been described, a plurality of elastic protrusions 22 are also formed on the protrusion sheet main body 21 in other regions. In such a manner, by also arranging the elastic protrusions 22 in regions where the contact sensor 12 or the force sensors 13 are not arranged, it is possible to permit a transformation amount in a parallel direction within the face of the protrusion sheet main body 21 when the elastic protrusions 22 are elastically transformed.

Further, by the elastic protrusions 22 being arranged with gaps in a matrix shape in the X direction and the Y direction on the protrusion sheet main body 21, it is possible to suppress the effect that the transformation of one elastic protrusion 22 has on the transformation of other elastic protrusions 22. Therefore, as compared to a case when the elastic protrusions 22 are arranged in contact with one another, it is possible to transmit external force accurately to each force sensor 13. Accordingly, it is possible to detect the direction and the magnitude of the external force with high precision. Further, it becomes easy to operate the direction and the magnitude of the external force from the differences in the force values of each of the force sensors 13 which are combined arbitrarily out of the force values of each of the force sensors 13.

Further, the size of an elastic protrusion 22 can be set arbitrarily. Here, the radius of the base portion of the elastic protrusion 22 is approximately 1.8 mm. On the other hand, the height (distance in the Z direction of the elastic protrusion 22) of the elastic protrusion 22 is approximately 2 mm. Furthermore, the separation interval between adjacent elastic protrusions 22 is approximately 1 mm.

Here, the Durometer hardness (hardness measurement value by a type A, ISO 7619-compliant durometer) of the elastic protrusions 22 is, for example, approximately between 30 and 60.

There is a total of four of the plurality of force sensors 13 in the two vertical columns and the two horizontal rows for each unit detection region S. The center of the four force sensors 13 (center of the unit detection region S) is the reference point P. For example, the size (size in plan view) of the unit detection region S is approximately 2.8 mm vertically×2.8 mm horizontally. Further, the areas of each of the four force sensors 13 are approximately equal.

Further, a force component separation mechanism 31 is configured by the plurality of (four) force sensors 13 in the unit detection region S and the elastic protrusions 22 that are arranged to face the force sensors 13. Specifically, as illustrated in FIG. 3, a force sensor 13 is configured to include first force electrodes 13a as the plurality of third electrodes that are provided to be point symmetrical with respect to the reference point P, a solid state force-sensitive conductor 32 that is provided above the first force electrodes 13a, and second force electrodes 13b as the fourth electrode provided on the force-sensitive conductor 32.

Further, as illustrated in FIG. 3, the contact sensor 12 is configured to include, for example, a first contact electrode 12a as the first electrode with a larger area in plan view than the first force electrodes 13a, the solid state force-sensitive conductor 32 that is provided on the first contact electrodes 12a, and a second contact electrode 12b as the second electrode provided on the force-sensitive conductor 32.

Here, in order to make the two sensors (12 and 13) distinguishable, as illustrated in FIG. 2, only the first contact electrode 12a and the first force electrodes 13a are shown and are referred to as the contact sensor 12 and the force sensors 13.

It is desirable that the area in plan view of the contact sensor 12 (first contact electrode 12a) be greater than the area of one force sensor 13 (first force electrode 13a). By the area of the contact sensor 12 being large, when force is applied to the protrusion sheet 20, the resistance value of when the first contact electrode 12a and the second contact electrode 12b contact via the force-sensitive conductor 32 is smaller than the resistance value of when the first force electrode 13a and the second force electrode 13b contact. Accordingly, the sensitivity of the contact sensor 12 increases.

A force-sensitive element by force-sensitive conductive rubber or the like, for example, may be used as the force-sensitive conductor 32. The force sensors 13 convert the force that is applied on force-sensitive conductive rubber or the like when external force acts on the contact face into an electric signal.

Further, the interval between adjacent force sensors 13 is approximately 0.1 mm. Therefore, there is no noise on the force values that are detected by adjacent force sensors 13 due to disturbances, static electricity, or the like.

A force-sensitive element such as a diaphragm gauge, for example, may be used as the force sensor 13. In such a case, the force that is applied on the diaphragm when external force acts on the contact face is converted into an electric signal.

Here, since at least two unit detection regions S are arranged on the detection device 100, it is not only possible to ascertain the force value and the direction of the force (slipping force) but to also ascertain the rotation torque.

Figure 4:
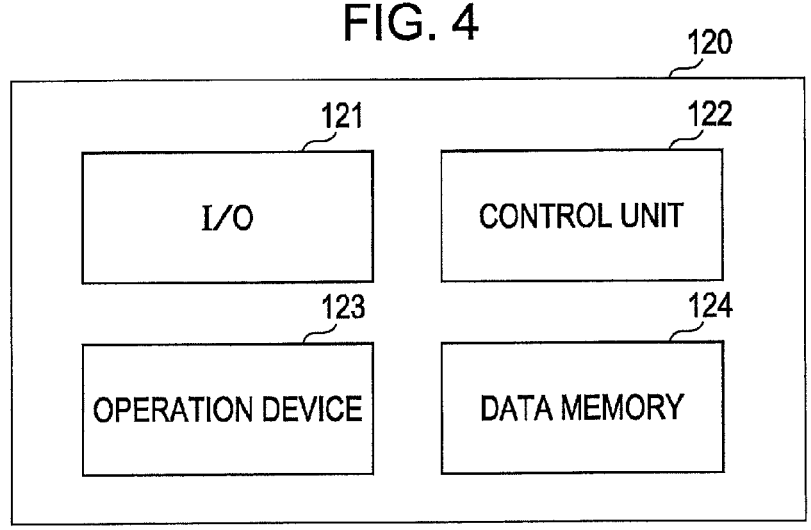
FIG. 4 is a block diagram that illustrates a configuration of a control unit in the detection device.

FIG. 4 is a block diagram that illustrates a configuration of a control unit of the detection device. The configuration of the control unit will be described below with reference to FIG. 4.

As illustrated in FIG. 4, the control unit 120 is configured to include an interface unit (I/O unit) 121 that performs receiving of signals with the detection unit 110 (refer to FIG. 1) and outputting of the operation result, a control unit 122 that performs a control process of each of the force sensors 13, an operation device 123 that performs each operation process, and a data memory 124 that stores data.

The operation device 123 operates, by the elastic protrusions 22 being elastically transformed by the external force, the differences in each of the force values that are detected by each of the force sensors 13 that are combined arbitrarily out of the force values that are detected by a plurality of force sensors 13, and operates the direction and the magnitude of the external force that is applied based on the differences.

Further, the operation device 123 performs a second operation process of computing the direction and the magnitude of the net force of the force that is detected by the detection unit 110, and a third operation process of computing the direction and the magnitude of the rotation torque that is acting on the detection unit 110 by the external force. Such operation methods will be described later.

Here, in the embodiment, although a CPU is respectively included in the control unit 122 and the operation device 123, a configuration in which the control of the device by the control unit 122 and the various operations by the operation device 123 are performed by one CPU is also possible. In other words, the control unit 122 may include a CPU and may be compatible with the various operations.

Figure 5:
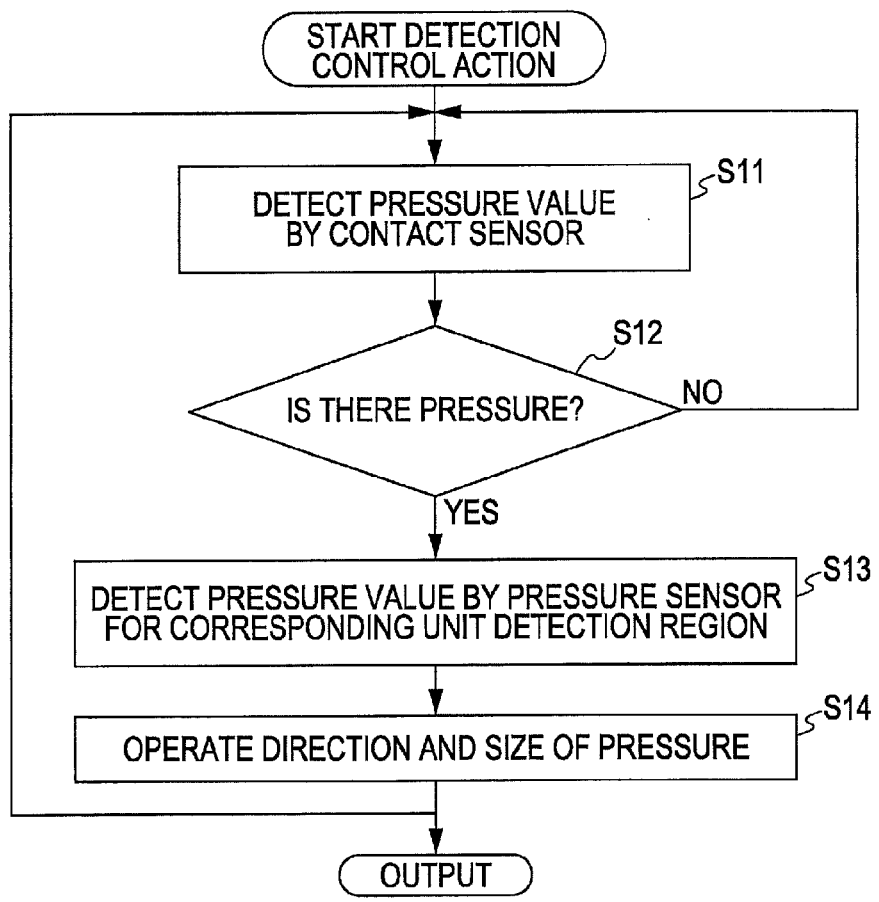
FIG. 5 is a flowchart that illustrates a detection control action of the detection device.

FIG. 5 is a flowchart that illustrates a detection control action of the detection device. The detection control action of the detection device will be described below with reference to FIG. 5.

As illustrated in FIG. 5, in step S11, the action of detecting force by the contact sensor 12 is performed and the force value is detected.

In step S12, it is determined whether or not there is external force from the detected force value. In a case when it is determined that there is external force, the process proceeds to step S13. In a case when it is determined that there is no external force, the process proceeds to step S11 and detection of the force value by the contact sensor 12 is continued to be performed.

In step S13, in a case when it is determined that there is external force, the next detection action by the force sensors 13 of the corresponding unit detection region S is determined from the determination result. Specifically, for example, the force values of the plurality of force sensors 13 that are arranged on the force component separation mechanism 31 of the corresponding unit detection region S are respectively detected.

In step S14, the direction and the magnitude of the external force are computed. Once the operation ends, while the result thereof is output, the process returns to step S11, and a detection action of detecting the force value by the contact sensor 12 and detecting the presence of external force is performed.

Figure 7A:
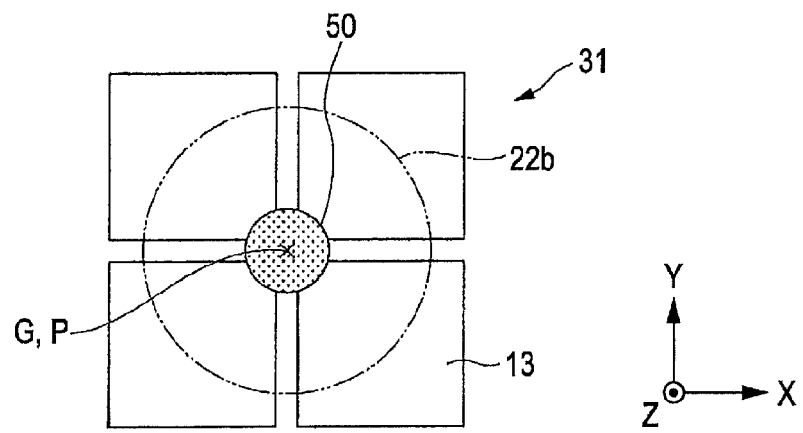
FIGS. 7A to 7C are schematic plan views that illustrate the relationship between the changes and the positions of the force in the force component separation mechanism corresponding to FIGS. 6A to 6C.
Figure 7B:
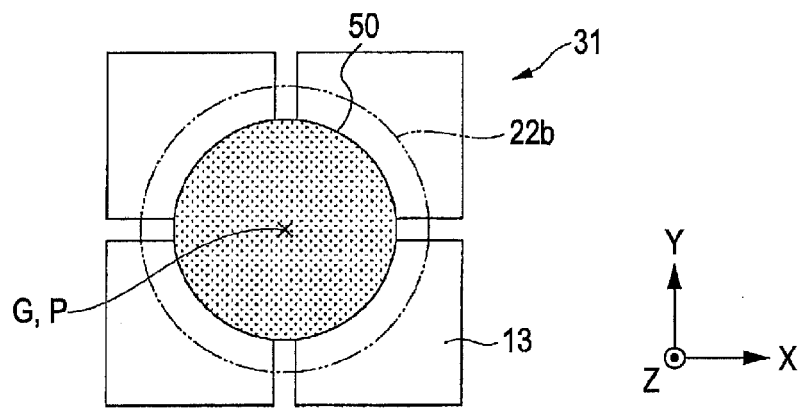
Figure 7C:
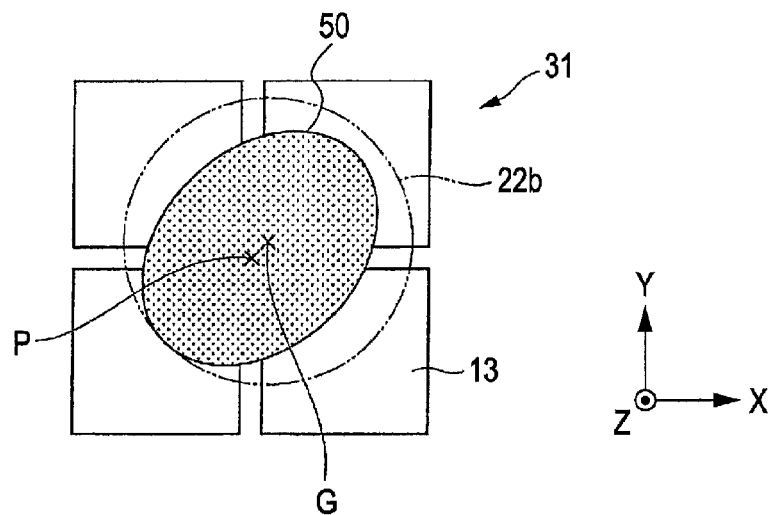

FIGS. 6A to 6C and 7A to 7C are explanatory diagrams of a method of detecting the size and the direction of external force. FIGS. 6A to 6C are schematic cross-sectional diagrams that illustrate changes in the force (force component separation mechanism). FIGS. 7A to 7C are schematic plan views that illustrate the relationship between the changes and the positions of the force in the force component separation mechanism corresponding to FIGS. 6A to 6C. The method of detection the size and the direction of the external force are described below with reference to FIGS. 6A to 6C and 7A to 7C. Here, in FIGS. 7A to 7C, the symbol G indicates the center of gravity (center of force) of the elastic protrusions 22.

FIGS. 6A and 7A illustrate a state before external force is applied on a front face 20a of the protrusion sheet 20 (when there is no external force that is acting). As illustrated in FIG. 6A, before external force is applied on the front face 20a of the protrusion sheet 20, the elastic protrusions 22 are not transformed. The distance between the sensor substrate 10 and the protrusion sheet 20 is thereby fixed and maintained.

Further, the center of gravity G of an elastic protrusion 22 is arranged at a position that overlaps the reference point P. The force values of each of the force sensors 13 at this time are stored in the data memory 124. The direction and the magnitude of the external force that is acting are ascertained with the force values of each of the force sensors 13 which are stored in the data memory 124 as the reference.

FIG. 7A illustrates a region 50 in which relative positions 22b of the base portions of the elastic protrusions 22 with respect to the plurality of force sensors 13 and the reference point P, the sensor substrate 10, and the elastic protrusions 22 are in contact in a state when external force is not applied.

FIGS. 6B and 7B illustrate a state in which external force in the vertical direction (state in which there is no slipping force) is applied on the front face 20a of the protrusion sheet 20. As illustrated in FIG. 6B, when external force in the vertical direction is applied on the elastic protrusions 22 via the protrusion sheet 20, the front end portions 22a of the elastic protrusions 22 are compressed and transform (bend) in the Z direction in a state of abutting the plurality of force sensors 13 that are arranged on the front face of the sensor substrate main body 11.

Furthermore, as compared to when there is no external force that is acting, the distance between the sensor substrate 10 and the protrusion sheet 20 becomes short. The force values of the force sensors 13 at this time become large compared to when there is no external force that is acting. Further, the change amount is approximately the same value for each of the force sensors 13.

FIGS. 6C and 7C illustrate a state in which external force is applied in a diagonal direction (state in which there is slipping force) on the front face 20a of the protrusion sheet 20. As illustrated in FIG. 6C, with the elastic protrusions 22, when external force in a diagonal direction is applied on the front face 20a of the protrusion sheet 20, the front end portions 22a of the elastic protrusions 22 tilt diagonally and are compressed and transform in a state of abutting the force sensors 13 that are arranged on the front face of the sensor substrate main body 11. That is, the elastic protrusions 22 bend in the Z direction, and the distance between the sensor substrate 10 and the protrusion sheet 20 becomes small compared to when there is no external force that is acting.

Further, as illustrated in FIG. 7C, the centers of gravity G of the elastic protrusions 22 deviate in the +X direction and the +Y direction from the reference point P. In such a case, the overlapping areas of the elastic protrusions 22 and each of the four force sensors 13 respectively differ. Specifically, the overlapping areas of the elastic protrusions 22 and each of the four force sensors 13 are greater for areas that overlap the force sensors 13 that are arranged in the +X and +Y directions than the areas that overlap the force sensors 13 that are arranged in the −X and −Y directions.

With the elastic protrusions 22, deviation in the transformation occurs by the external force in the diagonal direction. That is, the centers of gravity G of the elastic protrusions 22 deviate from the reference point P and move in the slipping direction (X direction and Y direction). Force values with difference values are then detected for each of the force sensors 13. Furthermore, the direction of the external force that is applied based on an operation method of the differences described later is ascertained.

In a case when external force in a diagonal direction is applied on the front face 20a of the protrusion sheet 20, the elastic protrusions 22 transform greatly. Furthermore, the relative positions 22b of the base portions of the elastic protrusions 22 deviate in a state in which the elastic protrusions 22 contact the sensor substrate 10. FIG. 7C illustrate the relative positions 22b of the base portions of the elastic protrusions 22 relative to the force sensors 13 and the reference point P deviating in the direction of the external force.

Figure 8:
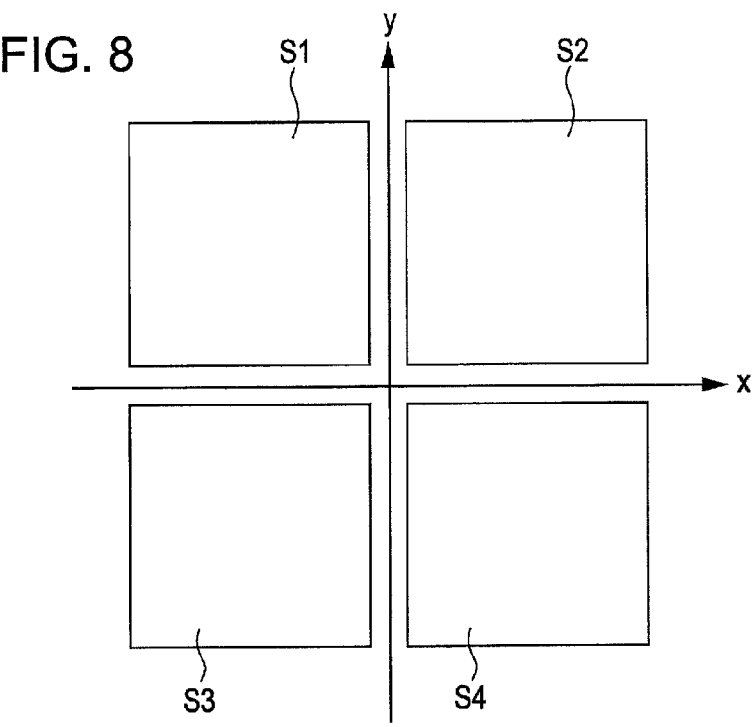
FIG. 8 is a diagram that illustrates the coordinate systems of a sensing region.
Figure 9:
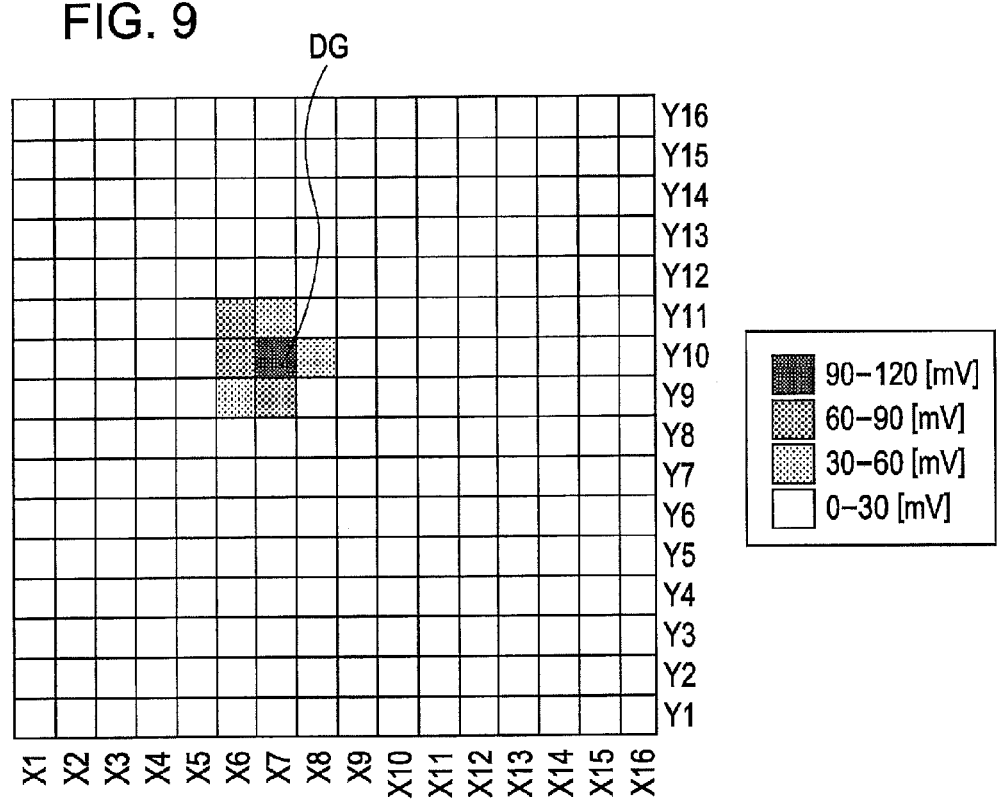
FIG. 9 is a force distribution in the vertical direction by the force sensors.
Figure 10:
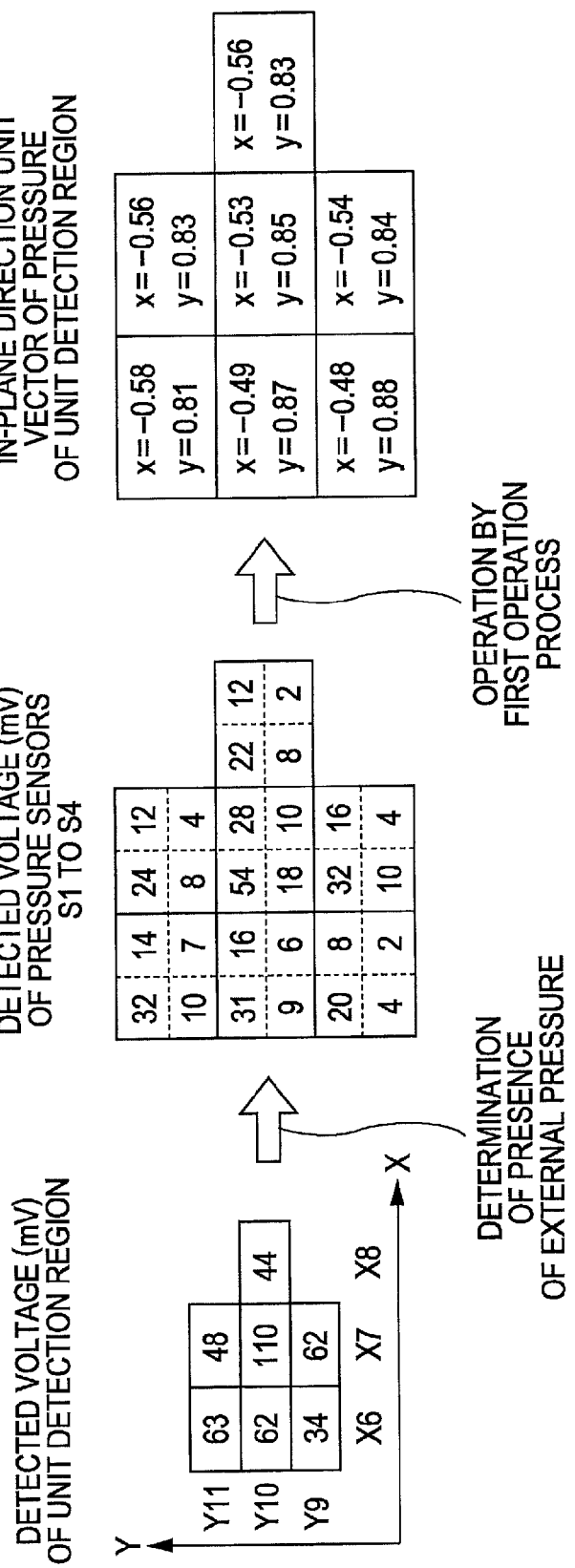
FIG. 10 is a diagram that illustrates a calculation example of the slipping direction by the force sensors.

FIG. 8 is a diagram that illustrates the coordinate systems of a sensing region. FIG. 9 is a diagram that illustrates a force distribution in the vertical direction by the force sensors. FIG. 10 is a diagram that illustrates a calculation example of the slipping direction by the force sensors.

As illustrated in FIG. 8, a plurality of force sensors S1 (13) to S4 (13) are arranged with a total of four with two vertical columns and two horizontal rows per unit detection region S. Here, if the force values (detection values) that each of the force sensors S1 to S4 detect are respectively $P_{S1}$, $P_{S2}$, $P_{S3}$, and $P_{S4}$, X direction components Fx of the external force (proportion of component force that is acting in the X direction out of the in-plane direction components of the external force) are represented by Expression 1 below.

$$F_x = \frac{(P_{S2} + P_{S4}) - (P_{S1} + P_{S3})}{P_{S1} + P_{S2} + P_{S3} + P_{S4}} \quad (1)$$

Further, Y direction components Fy of the external force (proportion of component force that is acting in the Y direction out of the in-plane direction components of the external force) are represented by Expression 2 below.

$$F_y = \frac{(P_{S1} + P_{S2}) - (P_{S3} + P_{S4})}{P_{S1} + P_{S2} + P_{S3} + P_{S4}} \quad (2)$$

Further, Z direction components Fz of the external force (vertical direction components of the external force, the Z axis is omitted from FIG. 8) are represented by Expression 3 below.

$$F_z = P_{S1} + P_{S2} + P_{S3} + P_{S4} \quad (3)$$

In the embodiment, the differences in the force values that are detected by the four force sensors S1 to S4 by the elastic protrusions 22 being elastically transformed by the external force are computed, and a direction in which the external force is applied based on such differences is computed.

As shown in Expression 1, in the X direction components Fx of the external force, out of the force values that are detected by the four force sensors S1 to S4, the values detected by the force sensor S2 and the force sensor S4 that are arranged in the +X direction are combined, and the values detected by the force sensor S1 and the force sensor S3 that are arranged in the −X direction are combined. In such a manner, the X direction components of the external force are ascertained based on the force value by the combination of the force sensor S2 and the force sensor S4 that are arranged in the +X direction and the force value by the combination of the force sensor S1 and the force sensor S3 that are arranged in the −X direction.

As shown in Expression 2, in the Y direction components Fy of the external force, out of the force values that are detected by the four force sensors S1 to S4, the values detected by the force sensor S1 and the force sensor S2 that are arranged in the +Y direction are combined, and the values detected by the force sensor S3 and the force sensor S4 that are arranged in the −Y direction are combined. In such a manner, the Y direction components of the external force are ascertained based on the force value by the combination of the force sensor S1 and the force sensor S2 that are arranged in the +Y direction and the force value by the combination of the force sensor S3 and the force sensor S4 that are arranged in the −Y direction.

As shown in Expression 3, the Z direction components Fz of the external force are ascertained by the net force of adding the force values of the four force sensors S1 to S4.

The direction and the magnitude of the total external force that is applied on the detection unit 110 is obtained by the total external force that is applied on each of the unit detection regions S obtained by the first operation process. Therefore, the second operation process of computing the direction and the magnitude of the external force is an operation of calculating to total external force that is applied on each of the unit detection regions S obtained by the first operation process.

Further, the direction and the magnitude of the rotation torque that is applied to the detection unit 110 is obtained by calculating the center of gravity of the distribution of the external force that is applied on the front face of the protrusion sheet 20 and taking the difference of the X direction components or the Y direction components of the external force that is applied on an arbitrary unit detection region S that is point symmetrical with the coordinate systems of the center of gravity as the center. Therefore, the third operation process of computing the direction and the magnitude of the rotation torque is an operation of the difference of the X direction components or the Y direction components of the external force that is applied on an arbitrary unit detection region S that is point symmetrical with the coordinate systems of the center of gravity of the distribution of the external force as the center.

Next, as illustrated in FIG. 9, a case when a position to the upper left from the center portion of the detection face of the touchpad is pressed by a finger is considered. At this time, the force in the vertical direction of the external force is the greatest at the center portion of the portion where the external force is acting (output voltages of the force sensors S1 to S4 are approximately between 90 and 120 mV). Further, the force in the vertical direction of the external force is sequentially smaller in order of the surrounding portions after the center portion (output voltages of the force sensors S1 to S4 are approximately between 60 and 90 mV) and the outermost circumference portions (output voltages of the force sensors S1 to S4 are approximately between 30 and 60 mV).

Further, in regions that are not pressed by a finger, the output voltages of the force sensors S1 to S4 are approximately between 0 and 30 mV. Here, unit detection regions (region in which the force sensors S1 to S4 are collected) are arranged in a matrix shape (For example, a total of 256 with vertically 16 columns and horizontally 16 rows) on the touchpad. Further, the symbols DG are the distributions of the centers of gravity of the detected external force.

Since in regions that are not pressed by a finger, the output voltages of the force sensors 13 are approximately between 0 and 30 mV, the output voltage 30 mV of the force sensors 13 is set as the determination standard of the presence of external force. That is, it is determined that external force is not applied if the total output voltage of the force sensors S1 to S4 in a unit detection region S is less than 30 mV, and it is determined that external force is applied if the output voltage of the force sensors S1 to S4 is equal to or greater than 30 mV.

In the case of FIG. 9, out of unit detection regions S in which vertically 16 columns and horizontally 16 rows are arranged, it is determined that external force is applied in seven unit detection regions S. The force value of the vertical direction of the external force is the greatest at the center portion of a range where external force is acting (total output voltages of the force sensors in the unit detection regions S are approximately between 90 and 120 mV). Further, the force value of the vertical direction of the external force is sequentially smaller in order of the surrounding portions after the center portion (approximately between 60 and 90 mV) and the outermost circumference portions (approximately between 30 and 60 mV).

As illustrated in FIG. 10, a calculation method of the in-plane direction components (slipping direction) of the external force in a case when a position to the upper left from the center portion of the detection face of the detection unit 110 is pressed diagonally with a finger. In the case of FIG. 9, out of unit detection regions S that are arranged in vertically 16 columns and horizontally 16 rows, the pressing force (external force) by a finger is determined to be applying external force on seven unit detection regions S. Therefore, by performing an operation of the in-plane direction components (slipping direction) of the external force by the first operation process by only extracting the seven unit detection regions S, the operation process is quickened.

Each of the seven extracted unit detection regions S respectively includes the four force sensors S1 to S4, and out of the force values detected by each of the force sensors S1 to S4, the differences of the force values that are detected by each of the force sensors that are arbitrarily combined is computed, and the direction in which the external force is applied is computed based on such differences. That is, in each of the unit detection regions S, The X direction components Fx of the external force and the Y direction components Fy of the external force in each of the unit detection regions S are calculated by the first operation process based on the above Expressions 1 and 2. In other words, by the first operation process, it is possible to operate the differences in the force values that are detected by each of the force sensors S1 to S4 and to ascertain the direction and the magnitude of the external force that is applied based on such differences.

By the second operation process, the direction and the magnitude of the total external force are calculated. Here, since the external force has direction components of −0.54 in the X direction and 0.845 in the Y direction, it can be seen that the total external force is acting in a direction that is approximately 122° anticlockwise with the +X direction as the reference.

Further, by the third operation process, the direction and the magnitude of the rotation torque are calculated. In the case of FIG. 9, the coordinate systems of the center of gravity DG of the distribution of external force are X=6.73 and Y=10.04, and is close to the unit detection region S that is positioned at X=7 and Y=10. Therefore, the size of the rotation torque is calculated from the difference in the X axis direction components from a combination of two unit detection regions S that have a point symmetrical relationship with X=7 and Y=10 as the center. Since the size of the difference is 8 mV, it can be seen that an extremely small rotation torque is acting in the right screw direction on the detection face of the detection unit 110.

As illustrated above, according to the detection device 100 of the first embodiment, the effects shown below are obtained.

(1) According to the detection device 100 of the first embodiment, since the detection of the presence of force is detected by the contact sensor 12, and the size and the like of the force is respectively separated and detected by the force component separation mechanism 31, as compared to a case when the presence of force or the like is detected with the entirety of the detection unit 110, it is possible to detect the presence of force quickly. Furthermore, by controlling only the detection action of the force component separation mechanism 31 by the control unit 120, the time taken to detect the magnitude of the force can be shortened as compared to the related art.

(2) According to the detection device 100 of the first embodiment, by arranging the contact sensor 12 and the force sensors 13 on the sensor substrate main body 11, the detection device 100 is able to be configured with little space. Specifically, it is possible to cause the detection device 100 to become thinner, smaller, and lower in cost. Further, since the sensors are on the same substrate, it is possible to suppress the correction for operation processing the size or the like of the force.

(3) According to the detection device 100 of the first embodiment, since two force component separation mechanisms 31 are included to interpose the contact sensor 12, it is possible to detect the direction or the rotation torque of the force.

(4) According to the detection device 100 of the first embodiment, since the area in plan view of the contact sensor 12 (first contact electrode 12a) is greater than the area of one force sensor 13 (first force electrode 13a), when force is applied on the protrusion sheet 20, the resistance value when the first contact electrode 12a and the second contact electrode 12b contact via the force-sensitive conductor 32 is smaller than the resistance value when the first force electrode 13a and the second force electrode 13b contact. It is thereby possible to increase the sensitivity of the contact sensor 12.

Second Embodiment

Configuration of Detection Device

Figure 11:
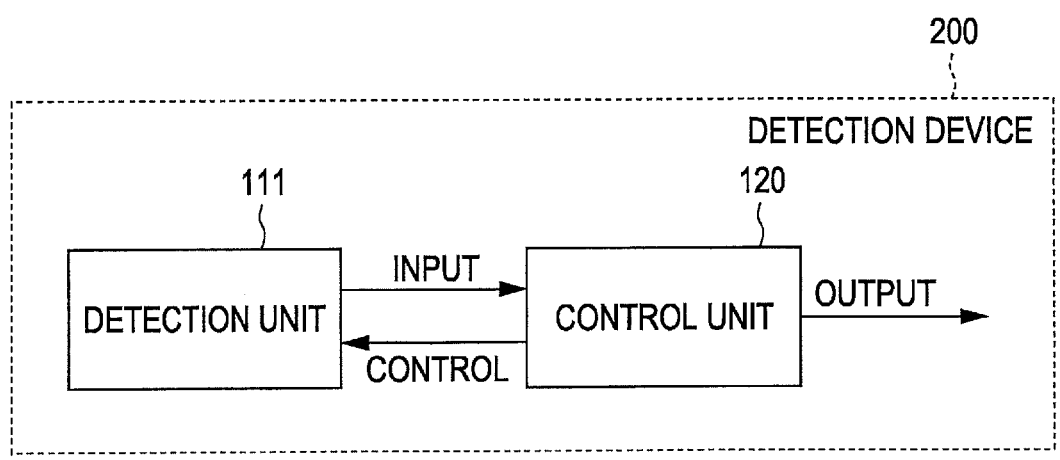
FIG. 11 is a block diagram that illustrates a configuration of a detection device according to a second embodiment.

FIG. 11 is a block diagram that illustrates a detection device according to a second embodiment. The configuration of the detection device according to the second embodiment will be described below with reference to FIG. 11.

Similarly to the first embodiment, a detection device 200 of the second embodiment includes the detection unit 111 that detects external force that is applied on a plurality of force sensors 113 (refer to FIG. 12), and the control unit 120 that performs a detection action of detecting the presence of external force from the force values that are detected by a portion out of the plurality of force sensors 113 and which controls the next detection action of the detection unit 111 from the detection result.

Figure 12:
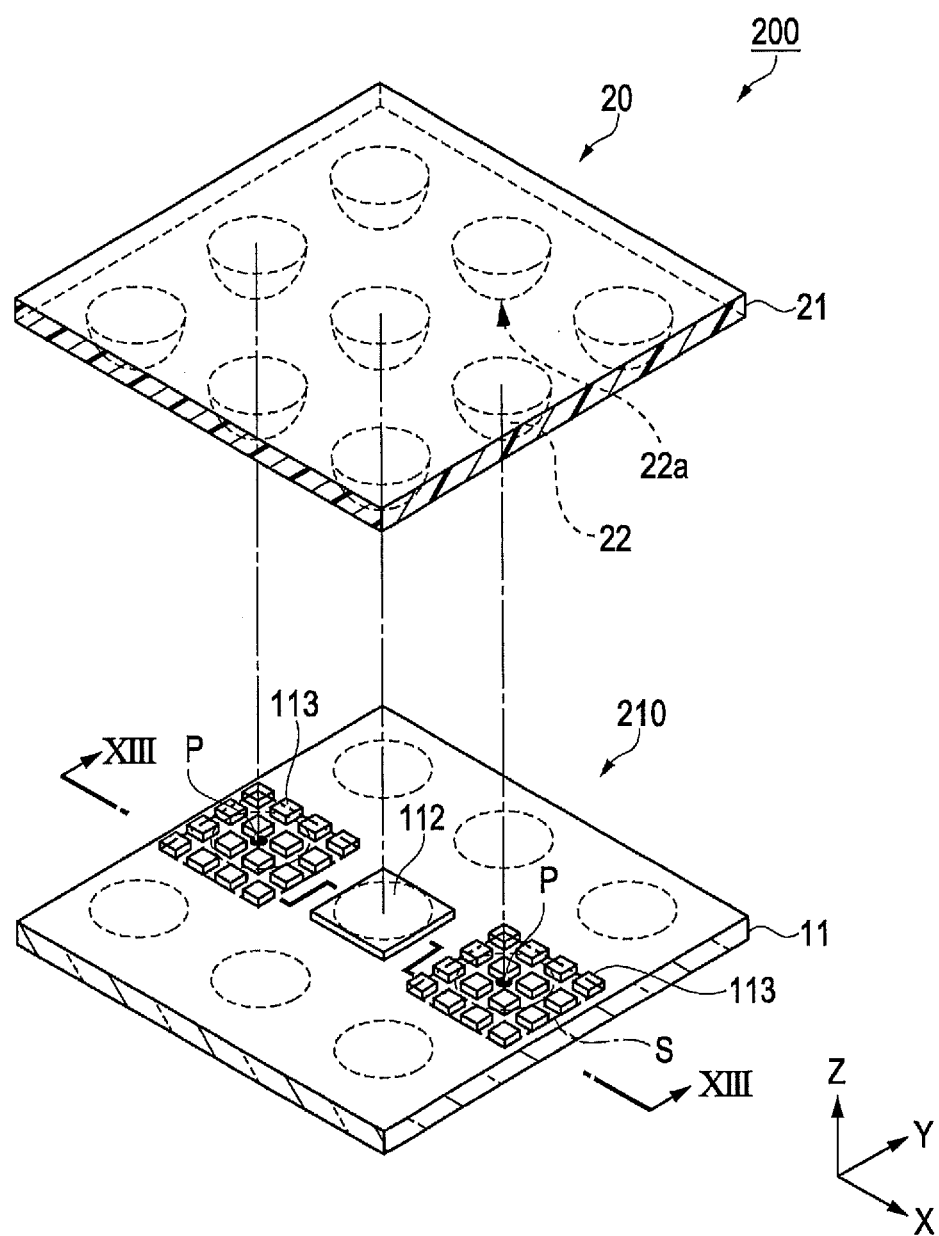
FIG. 12 is an exploded perspective diagram that illustrates an outline configuration of the detection device.
Figure 13:
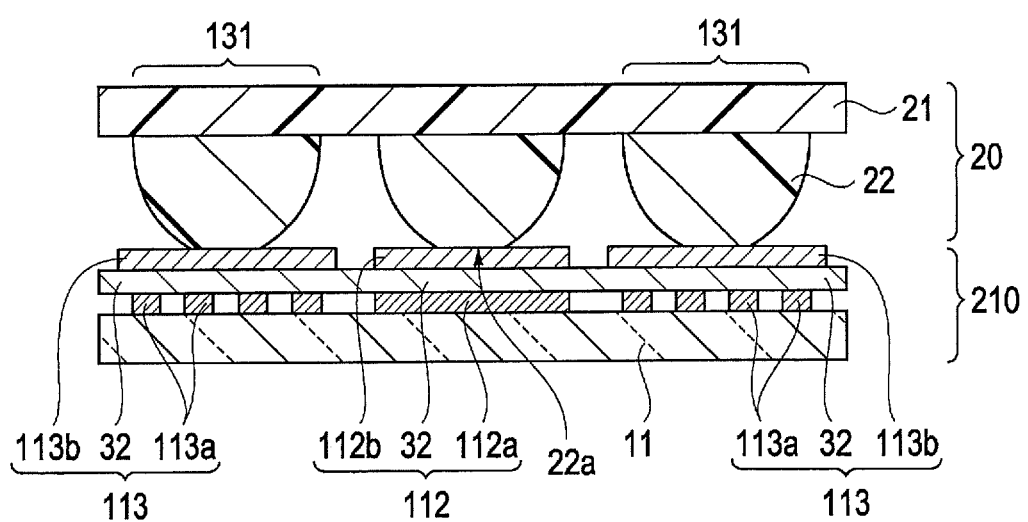
FIG. 13 is a schematic cross-sectional diagram along a line XIII-XIII of the detection device illustrated in FIG. 12.

FIG. 12 is an exploded perspective diagram that illustrates an outline configuration of the detection device of the second embodiment corresponding to FIG. 2. FIG. 13 is a schematic cross-sectional diagram along a line XIII-XIII of the detection device illustrated in FIG. 12. The configuration of the detection device will be described below with reference to FIGS. 12 and 13.

As illustrated in FIG. 12, in the detection device 200 of the second embodiment, portions in which a plurality of force sensors 113 are arranged with at least four vertical columns and four horizontal rows in two directions that intersect each other (X direction and Y direction) are different from the detection device 100 described in the first embodiment above. Below, the same symbols are given to the same configuration members as the first embodiment, and descriptions thereof will be omitted or simplified.

The detection device 200 includes a sensor substrate 210 that includes a plurality of force sensor 113 that are arranged around the reference point P and a contact sensor 112 that is provided between a unit detection region S that is configured by a plurality of force sensors 113 and a unit detection region S. Further, as with the first embodiment, the detection device 200 includes a protrusion sheet 20 with which the center of gravity is positioned at a position that overlaps the reference point P and on which elastic protrusions 22 of which the front end portions abut the sensor substrate 210 by external force and which are elastically transformed by external force. Here, a calculation that is expanded in a case when i (i is an integer equal to or greater than 4) force sensors 113 are used is shown.

As illustrated in FIG. 12, at least a total of 16 force sensors 113 vertically in four columns and horizontally in four rows in two directions that intersect each other (X direction and Y direction) are arranged on the sensor substrate main body 11. The center of the 16 force sensors 113 (center of the unit detection region S) becomes the reference point P.

Further, the force component separation mechanism 131 is configured by a plurality of force sensors 113 in the unit detection region S and elastic protrusions 22 that are arranged to face the force sensors 113. Specifically, as illustrated in FIG. 13, the force sensors 113 are configured to include a plurality of first force electrodes 113a that are provided to be point symmetrical to the reference point P, the solid state force-sensitive conductor 32 that is provided on the first force electrodes 113a, and second force electrodes 113b that are provided on the force-sensitive conductor 32.

Further, as illustrated in FIG. 13, the contact sensor 112 is configured to include, for example, a first contact electrode 112a that has a greater area in plan view than the first force electrodes 113a, the solid state force-sensitive conductor 32 that is provided on the first contact electrode 112a, and a second contact electrode 112b that is provided on the force-sensitive conductor 32.

Here, similarly to the first embodiment, in order for two sensors (112, 113) to be easier to distinguish, as illustrated in FIG. 12, only the first contact electrode 112a and the first force electrodes 113a are shown, which are referred to as the contact sensor 112 and the force sensors 113.

Figure 14A:
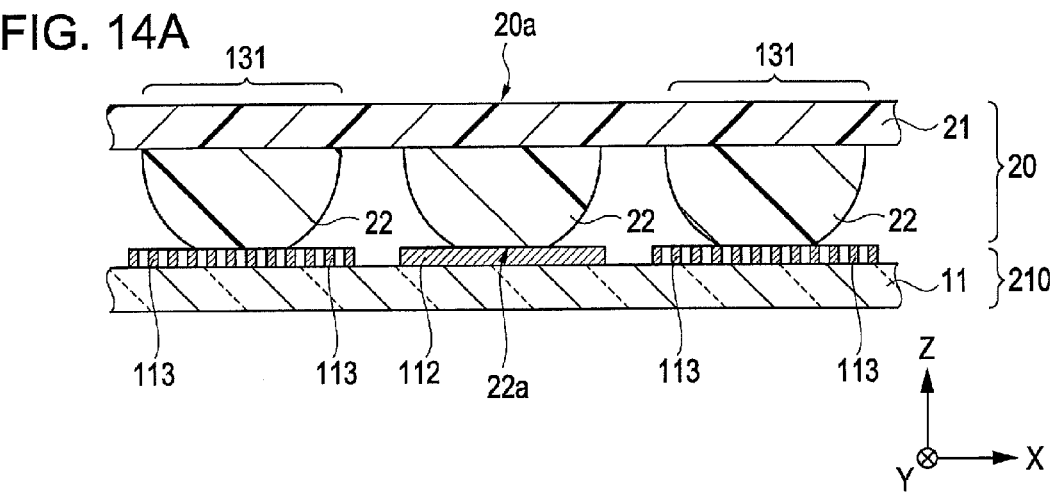
FIGS. 14A to 14C are schematic cross-sectional diagrams that illustrate changes in the force component separation mechanism.
Figure 14B:
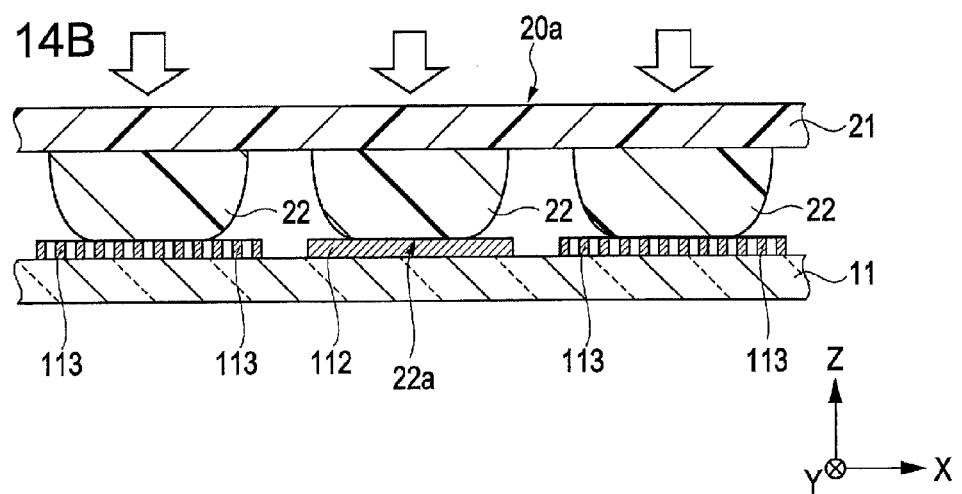
Figure 14C:
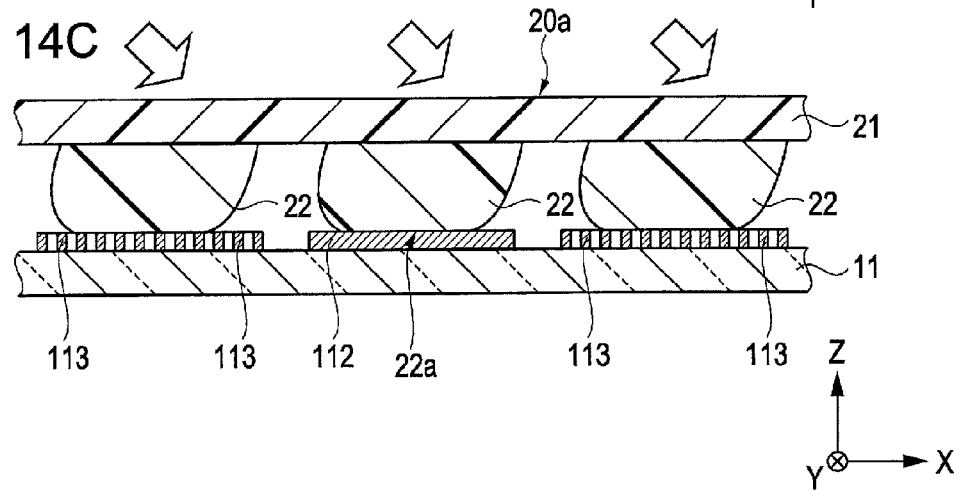
Figure 15A:
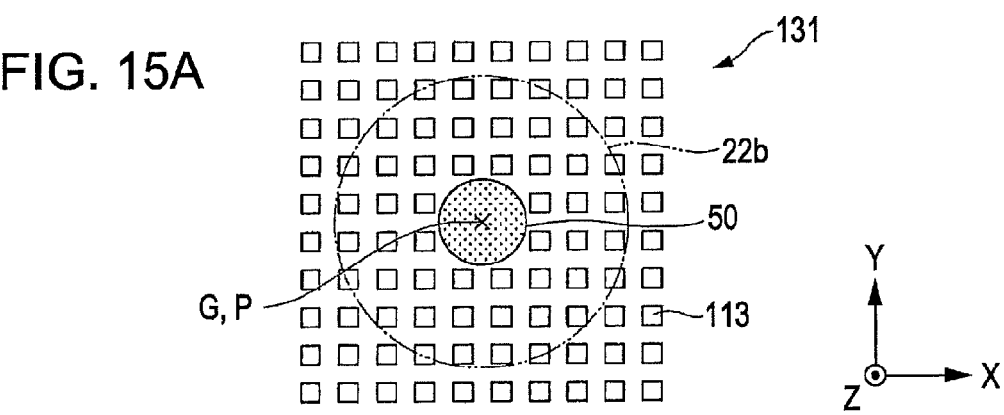
FIGS. 15A to 15C are schematic plan views that illustrate the changes in the force component separation mechanism corresponding to FIGS. 14A to 14C.
Figure 15B:
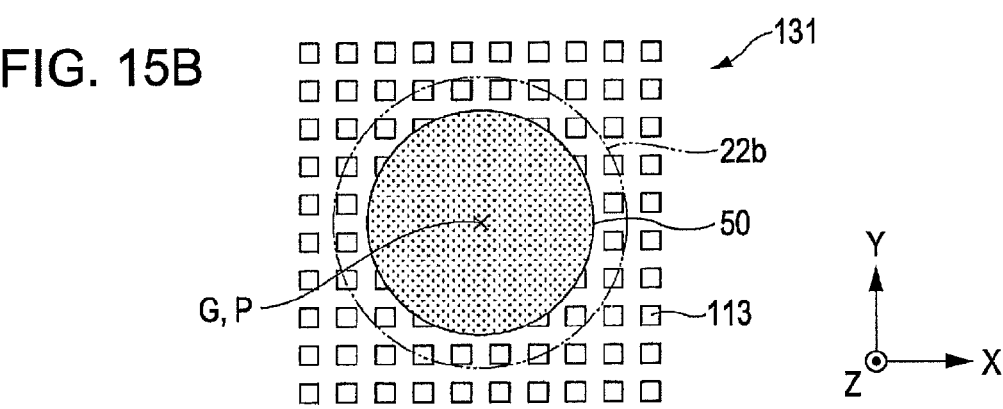
Figure 15C:
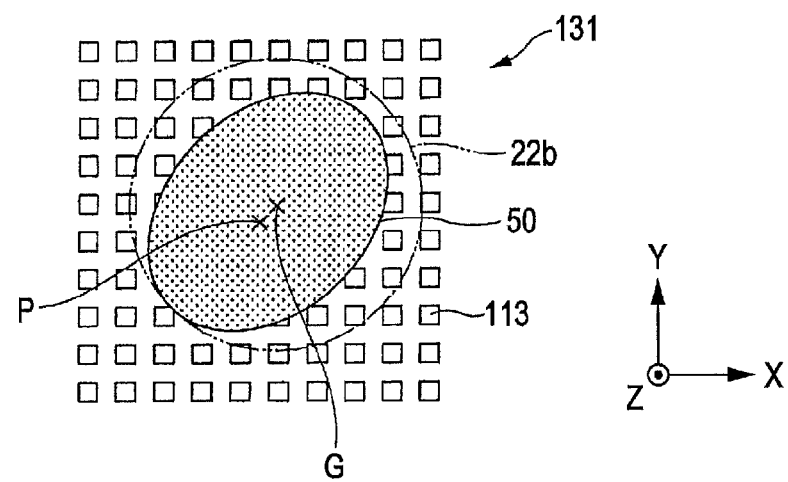

FIGS. 14A to 14C are schematic cross-sectional diagrams that illustrate changes in the force of the second embodiment corresponding to FIGS. 6A to 6C. FIGS. 15A to 15C are schematic plan views that illustrate the changes in the force component separation mechanism in the unit detection region S of the second embodiment corresponding to FIGS. 7A to 7C. A method of detecting the size and the direction of external force will be described below with reference to FIGS. 14A to 14C and 15A to 15C.

FIGS. 14A and 15A illustrate a state before external force is applied on the front face 20a of the protrusion sheet 20 (when no external force is acting). As illustrated in FIG. 14A, before external force is applied on the front face 20a of the protrusion sheet 20, the elastic protrusions 22 are not transformed. The distance between the sensor substrate 210 and the protrusion sheet 20 is therefore fixed and maintained. At this time, the centers of gravity G of the elastic protrusions 22 are arranged at positions that overlap the reference point P. the force values of each of the force sensors 113 at this time are stored on the data memory 124. The direction and the magnitude of the external force that is acting is ascertained with the force values of each of the force sensors 113 which are stored in the data memory 124 as the reference.

FIG. 15A illustrates the region 50 in which the relative positions 22b of the base portions of the elastic protrusions 22 relative to the plurality of force sensors 113 and the reference point P, the sensor substrate 210, and the elastic protrusions 22 are in contact in a state when external force is not applied.

FIGS. 14B and 15B illustrate a state in which external force in the vertical direction (state in which there is no slipping force) is applied on the front face 20a of the protrusion sheet 20. As illustrated in FIG. 14B, when external force in the vertical direction is applied on the front face of the protrusion sheet 20, the elastic protrusions 22 are compressed and transform in the Z direction. Furthermore, as compared to when there is no external force that is acting, the distance between the sensor substrate 210 and the protrusion sheet 20. As compared to when there is no external force that is acting, the force values of the force sensors 113 at this time are large. Further, the transformation amounts thereof are also similar values to each of the force sensors 113.

FIGS. 14C and 15C illustrate a state in which external force is applied in a diagonal direction (state in which there is slipping force) on the front face 20a of the protrusion sheet 20. As illustrated in FIG. 14C, when external force in a diagonal direction is applied on the front face 20a of the protrusion sheet 20, the elastic protrusions 22 are compressed and transform with a diagonal tilt. Accordingly, the elastic protrusions 22 bend in the Z direction, and as compared to when there is no external force that is acting, the distance between the sensor substrate 210 and the protrusion sheet 20 becomes short.

Further, as illustrated in FIG. 15C, the bend amount of the protrusion sheet 20 is greater for the +X direction components than for the −X direction components. At this time, the centers of gravity G of the elastic protrusions 22 deviate in the +X direction and the +Y direction from the reference point P. In such a case, with the proportion of areas in which the front end portions 22a of the elastic protrusions 22 and the plurality of force sensors 113 overlap, the areas that overlap with portions that are arranged in the +X direction and the +Y direction have a greater proportion of overlapping areas than the areas that overlap with portions that are arranged in the −X direction and the −Y direction.

Figure 16:
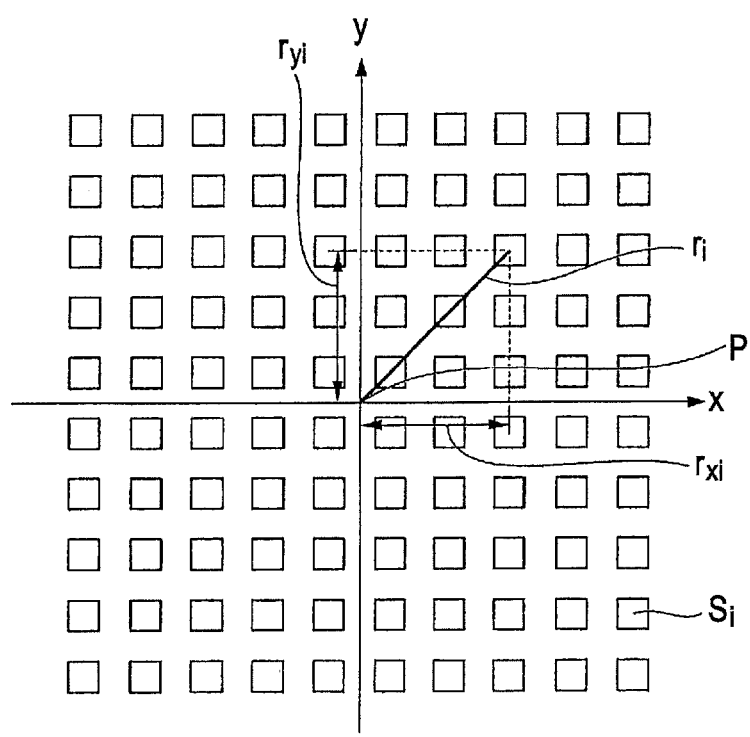
FIG. 16 is a diagram that illustrates the coordinate systems of the sensing region.

FIG. 16 is a diagram that illustrates the coordinate systems of a sensing region of a unit detection region S of the second embodiment corresponding to FIG. 8. Here, in FIG. 16, a plurality of force sensors $S_i$ (100 force sensors $S_i$) are arranged in a matrix shape, and 25 each of the force sensors $S_i$ are respectively arranged in a region that is divided in the −X direction and the +Y direction, a region that is divided in the +X direction and the +Y direction, a region that is divided in the −X direction and the −Y direction, and a region that is divided in the +X direction and −Y direction. Further, although 100 force sensors $S_i$ are illustrated in FIG. 16 for convenience, without limiting thereto, the arrangement number of the force sensors $S_i$ may be changed arbitrarily.

As illustrated in FIG. 16, there is a total of 100 of the plurality of force sensors $S_i$ that are arranged per unit detection region S with vertically 10 columns and horizontally 10 rows. Here, the force values (detection values) that each of the force sensors $S_i$ detects are respectively $P_i$ (i=1 to 100), and the in-plane direction components of the distance between the reference point P and each of the force sensors $S_i$ are $r_i$ (i=1 to 100).

Further, if the X direction components out of the in-plane direction components is $r_{xi}$ (i=1 to 100) and the Y direction components out of the in-plane direction components is $r_{yi}$ (i=1 to 100), the X direction components Fx (proportion of component force that is acting in the X direction out of the in-plane direction components of the external force) of the external force that is applied to the unit detection regions S is represented by Expression 4 below.

$$F_x = \frac{\sum_i P_i r_{xi}}{\sum_i P_i} \quad (4)$$

Further, the Y direction components Fy (proportion of component force that is acting in the Y direction out of the in-plane direction components of the external force) of the external force that is applied to the unit detection regions S is represented by Expression 5 below.

$$F_y = \frac{\sum_i P_i r_{yi}}{\sum_i P_i} \quad (5)$$

Further, the Z direction components Fz (vertical direction components of the external force) of the external force that is applied to the unit detection regions S is represented by Expression 6 below.

$$F_z = \sum_i P_i \quad (6)$$

In the embodiment, the differences in the force values of each of the force sensors $S_i$ that are combined arbitrarily out of the force values of the 100 force sensors $S_i$ that are changed by the elastic protrusions 22 being elastically transformed by external force are computed, and the direction in which the external force has been applied is computed based on such differences.

As shown in Expression 4, in the X direction components Fx of the external force, out of the force values that are detected by the 100 force sensors $S_i$, the values that are detected by the force sensors $S_i$ that are arranged relatively in the +X direction are combined and the values detected by the force sensors $S_i$ that are arranged relatively in the −X direction are combined. In such a manner, the X direction components of the external force are ascertained based on the differences between the force values by the combination of the force sensors $S_i$ that are arranged relatively in the +X direction and the force values by the combination of the force sensors $S_i$ that are arranged relatively in the −X direction.

As shown in Expression 5, in the Y direction components Fy of the external force, out of the force values that are detected by the 100 force sensors $S_i$, the values that are detected by the force sensors $S_i$ that are arranged relatively in the +Y direction are combined and the values detected by the force sensors $S_i$ that are arranged relatively in the −Y direction are combined. In such a manner, the Y direction components of the external force are ascertained based on the differences between the force values by the combination of the force sensors $S_i$ that are arranged relatively in the +Y direction and the force values by the combination of the force sensors $S_i$ that are arranged relatively in the −Y direction.

As shown in Expression 6, the Z direction components Fz of the external force are ascertained by the net force of adding the force values detected by the 100 force sensors $S_i$.

Here, the calculation of the direction in which the external force is acting may adopt a method of ascertaining by an average value of the calculation result of the force values that are detected by the 100 force sensors $S_i$ or a method of ascertaining by the maximum value (for example, detection values that are greater than a predetermined threshold value) out of the calculation result of the force values that are detected by the 100 force sensors $S_i$.

Similarly to the first embodiment, the direction and the magnitude of the net force of the external force that is applied on the detection unit 111 are obtained by the total of the external force that is applied on each of the unit detection regions S that are obtained by the first operation process. Therefore, the second operation process that operates the direction and the magnitude of the total external force becomes an operation of calculating the total external force that is applied to each of the unit detection regions S which is obtained in the first operation process.

Further, the direction and the magnitude of the rotation torque that is applied to the detection unit 111 are obtained by calculating the coordinate systems of the center of gravity of the distribution of the external force that is applied on the front face 20a of the protrusion sheet 20 and taking the difference of the X direction components or the Y direction components of the external force that is applied on an arbitrary unit detection region that is point symmetrical with the coordinate systems of the center of gravity if the distribution of the external force as the center. Therefore, the third operation process of computing the direction and the magnitude of the rotation torque is an operation of the differences in the X direction components or the Y direction components of the external force that is applied on an arbitrary unit detection region S that is point symmetrical with the coordinate systems of the center of gravity of the distribution of the external force as the center.

As described above, according to the detection device 200 of the second embodiment, the effects below are obtained in addition to the effects of (1) to (4) of the first embodiment described above.

(5) According to the detection device 200 of the second embodiment, since the number of force sensors 113 that are arranged is large compared to in the first embodiment, it is possible to determine the direction and the magnitude of the external force that is acting by integrating the detection results of each of the force sensors 113 based on the force values detected by a multitude of force sensors 113. Therefore, it is possible to detect the direction and the magnitude of the external force with high precision.

Third Embodiment
Electronic Apparatus

Figure 17:
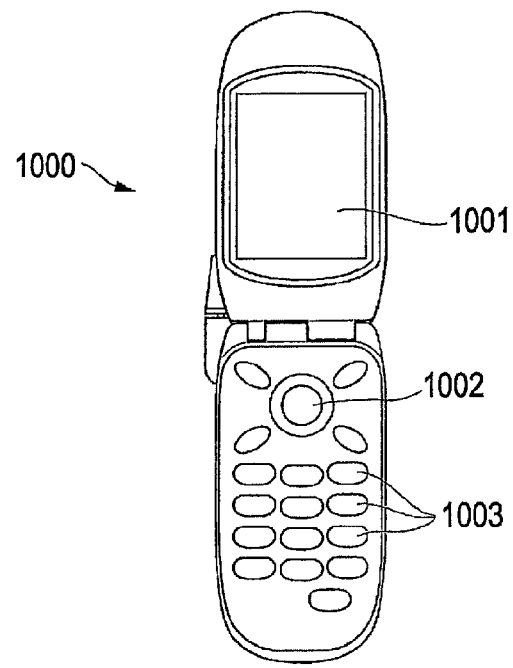
FIG. 17 is a schematic diagram that illustrates an outline configuration of a mobile phone as an example of an electronic apparatus.

FIG. 17 is a schematic diagram that illustrates an outline configuration of a mobile phone on which either of the detection devices of the embodiments described above is applied. A mobile phone 1000 as an example of an electronic apparatus includes a plurality of operation buttons 1003, a control pad 1002, and a liquid crystal panel 1001 as a display unit. By operating the control pad 1002, the screen to be displayed on the liquid crystal panel 1001 is scrolled. A menu button (not shown) is displayed on the liquid crystal panel 1001. For example, by meeting a cursor (not shown) on the menu button and pressing hard on the control pad 1002, a phonebook is displayed or the phone numbers on the mobile phone 1000 are displayed.

Figure 18:
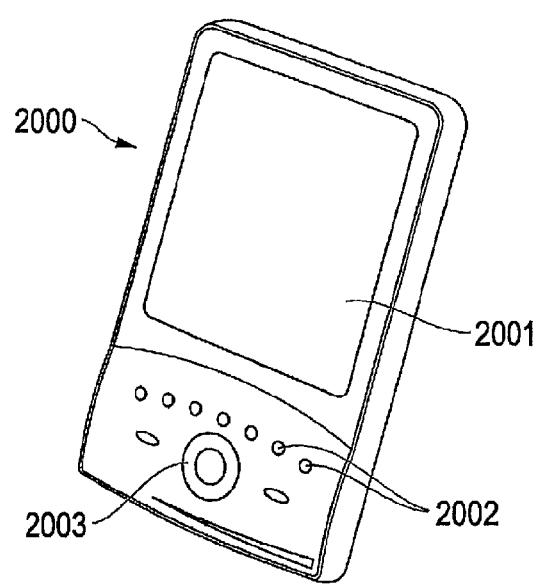
FIG. 18 is a schematic diagram that illustrates an outline configuration of a mobile information terminal as an example of the electronic apparatus.

FIG. 18 is a schematic diagram that illustrates an outline configuration of a mobile information terminal (PDA: Personal Digital Assistants) on which either of the detection devices according to the embodiments described above is applied. A mobile information terminal 2000 as an example of the electronic apparatus includes a plurality of operation buttons 2002, a control pad 2003, and a liquid crystal panel 2001 as a display unit. When the control pad 2003 is computed, the menu displayed on the liquid crystal panel 2001 can be computed. For example, by meeting a cursor (not shown) on a menu (not shown) and pressing hard on the control pad 2003, an address book is displayed or an appointment book is displayed.

According to such an electronic apparatus, since one of the detection devices 100 and 200 described above is included in the control pad 1002 or 2003, it is possible to provide an electronic apparatus that is able to detect the direction and the magnitude of the external force.

Here, as the electronic apparatus, an apparatus including, for example, a personal computer, a video camera monitor, a car navigation device, a pager, an electronic organizer, a calculator, a word processor, a work station, a television phone, a POS terminal, a digital still camera, or a touch panel or the like is also exemplified. It is also possible to apply a detection device according to the invention on such electronic apparatuses.

As described above, it is possible to obtain the below result by the electronic apparatus of the third embodiment.

(6) According to the electronic apparatus of the third embodiment, since the detection devices 100 and 200 described above are included, it is possible to provide an electric apparatus that is able to detect the presence of external force quickly and to detect the direction and the magnitude of the external force with high precision.

Fourth Embodiment
Robot

Figure 19A:
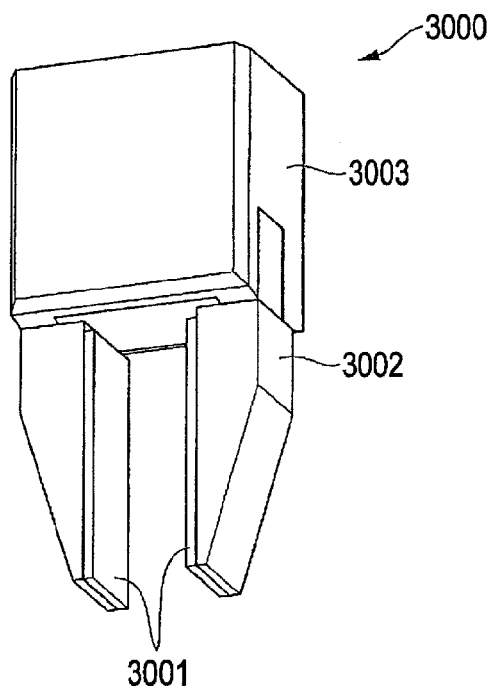
FIGS. 19A and 19B are schematic diagrams that illustrate an outline configuration of a robot hand.
Figure 19B:
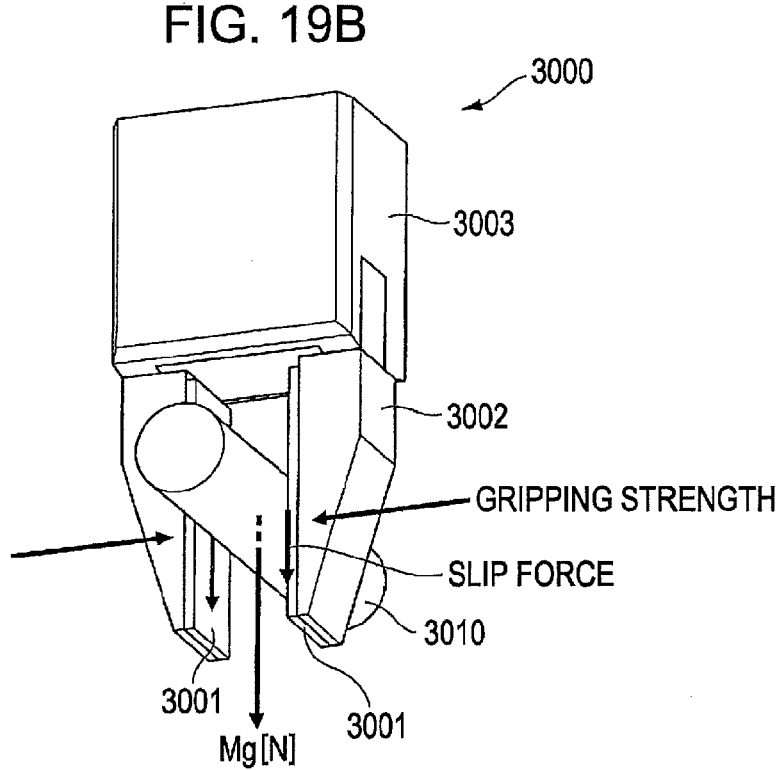

FIGS. 19A and 19B are schematic diagrams that illustrate an outline configuration of a robot hand to which either of the detection devices according to the above embodiments is applied. As illustrated in FIG. 19A, a robot hand 3000 includes a main body portion 3003, a pair of arm portions 3002, and a gripping portion 3001 to which either of the detection devices 100 and 200 described above is applied. For example, if a driving signal is transmitted to the arm portions 3002 by a control device such as, for example, a remote controller, the pair of arm portions 3002 operates to open and close.

As illustrated in FIG. 19B, a case when a target object 3010 such as a cup is gripped by the robot hand 3000 is considered. At this time, the force that is acting on the target object 3010 is detected as force by the gripping portion 3001. Since the robot hand 3000 includes either of the detection devices 100 or 200 described above as the gripping portion 3001, it is possible to detect the force (component of the slipping force) or the rotation torque in a direction that slips with gravity Mg together with the force in a vertical direction to the front face (contact face) of the target object 3010. For example, so that a soft object is not deformed or a slippery object is not dropped, it is possible to hold the target object 3010 by adjusting the force according to the feel of the target object 3010.

According to such a robot, since either of the detection devices 100 and 200 described above is included, it is possible to provide a robot that is able to detect the direction and the magnitude of external force with high precision.

As detailed above, according to the robot of the fourth embodiment, the effects below are obtained.

(7) According to the robot of the fourth embodiment, since the detection devices 100 or 200 described above is included, it is possible to provide a robot that can determine the presence of external force quickly, and which can detect the direction and the magnitude of the external force with high precision.

Here, the embodiments are not limited to the above, and may be realized as below.

Modification 1

Figure 20:
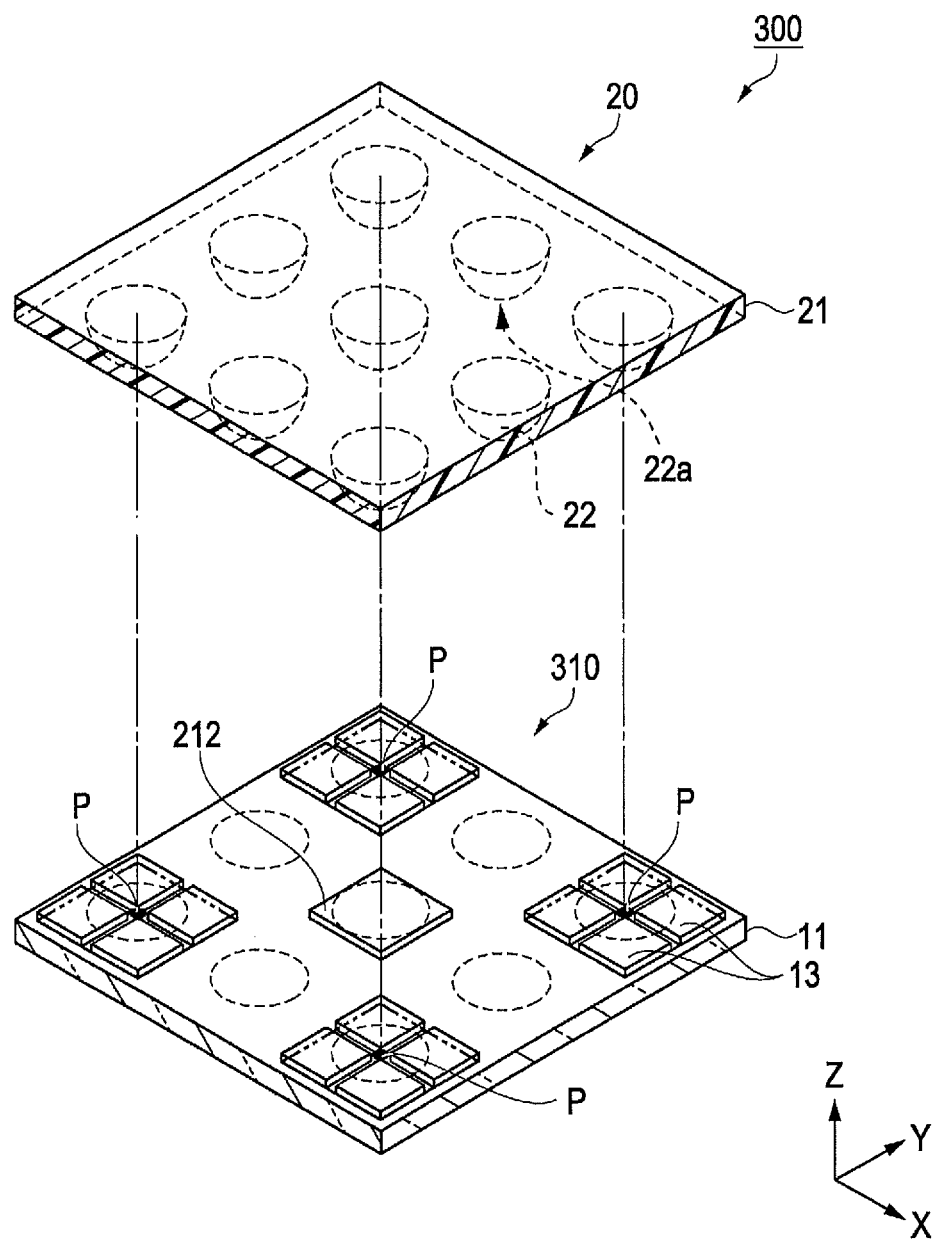
FIG. 20 is an exploded perspective diagram that illustrates a configuration of a detection device of a modification.

Without being limited to arranging the contact sensor 12 between two unit detection regions S as in the first embodiment described above, a configuration of a detection device 300 as illustrated in FIG. 20, for example, may be possible. FIG. 20 is an exploded perspective diagram that illustrates a configuration of a detection device of a modification.

The detection device 300 illustrated in FIG. 20 has a unit detection region S that includes a plurality of force sensors 13 (refer to FIG. 2) which is arranged in four locations to be point symmetrical with a contact sensor 212 as the reference point. Here, similarly to the above embodiments, the elastic protrusions 22 are arranged in regions where the contact sensor 212 and the force sensors 13 are not arranged.

In such a manner, by increasing the number of force component separation mechanisms 31 (refer to FIG. 3) with respect to one contact sensor 212, it is possible to detect the detection of rotation torque or the like with greater precision. Here, it is desirable that the selection be made according to the usage method such as the detection device 100 of the first embodiment in a case when it is desirable to shorten the operation time, and the detection device 300 of Modification 1 in a case when it is desirable to improve detection accuracy.

Modification 2

Figure 21A:
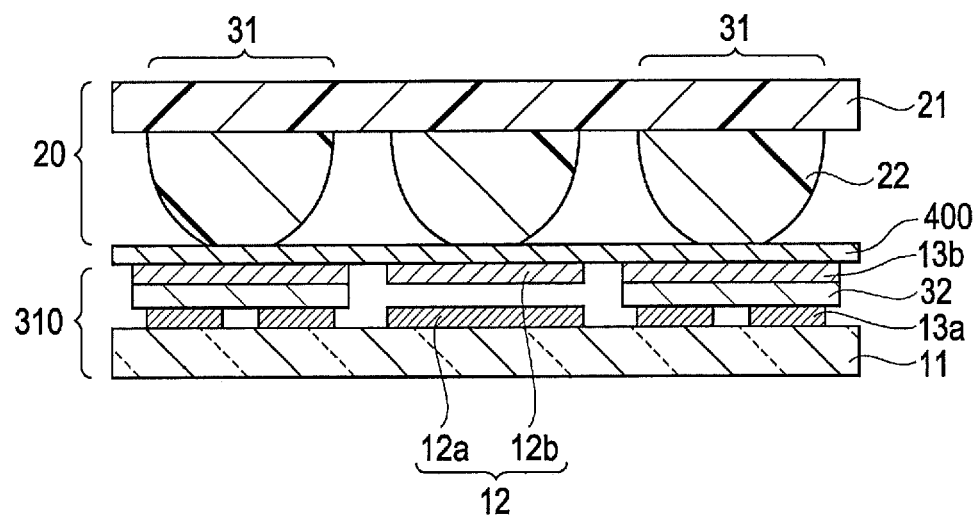
FIGS. 21A and 21B are schematic cross-sectional diagrams that illustrate the structure of a detection device of the modification.
Figure 21B:
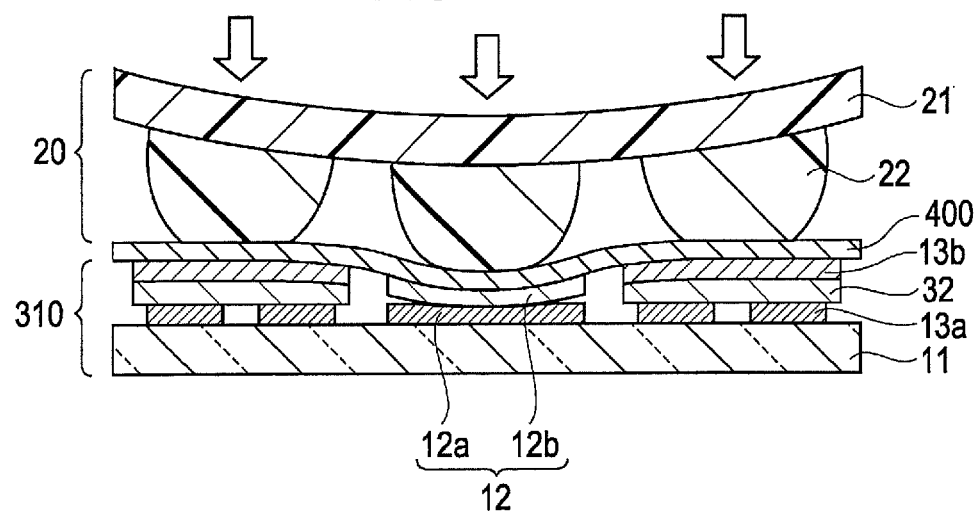

Without limiting to providing the force-sensitive conductor 32 between the first contact electrode 12*a* and the second contact electrode 12*b* of the contact sensor 12 as described above, a structure of not providing the force-sensitive conductor 32 as illustrated in FIGS. 21A and 21B is also possible. FIGS. 21A and 21B are schematic cross-sectional diagrams that illustrate the structure of a detection apparatus of a modification. FIG. 21A illustrates a state in which force is not applied on the protrusion sheet 20. FIG. 21B illustrates a state in which force is applied on the protrusion sheet 20.

In so doing, since there is no force-sensitive conductor 32 on the contact sensor 12, it is possible to cause the second contact electrode 12*b* and the first contact electrode 12*a* to be in contact even with weak force. In so doing, it is possible to obtain higher sensitivity with the contact sensor 12 than the force component separation mechanism 31 despite being on the same sensor substrate main body 11.

Further, as illustrated in FIGS. 21A and 21B, an elastic sheet 400 may be provided between the protrusion sheet 20 and a sensor substrate 310. Here, the elastic sheet 400 and the elastic protrusions 22 are formed to be fixed or integral. In so doing, it is possible to suppress the positions of the elastic protrusions 22 from deviating when force is applied to the protrusion sheet 20.

Further, by the elastic protrusions 22 being fixed on the elastic sheet 400, it is possible to suppress two adjacent elastic protrusions 22 from being compressed and transforming in directions that are opposite to each other, and it is possible to detect force with high precision. Here, if the elastic protrusions 22 have a structure of not deviating, the elastic protrusions 22 may be not fixed on the elastic sheet 400.

Modification 3

As described above, the arrangement relationship of the contact sensor 12 and the force component separation mechanism 31 is not limited to the structure of arranging the contact sensor 12 between (in the middle of) two force component separation mechanisms 31 (refer to FIG. 2), and for example, a structure of arranging at least two force component separation mechanisms 31 in the surroundings of the contact sensor 12 is possible. Here, since it is desirable to detect the rotation torque with high precision, it is desirable that the distance between the at least two force component separation mechanisms 31 be as far apart as possible with the contact sensor 12 as the center.

Modification 4

As described above, after it is determined that there is force, without limiting to outputting the size or the direction of the force, the below action, for example, may be performed. In the case of the robot hand 3000 illustrated in FIGS. 19A and 19B, when the pair of arm portions 3002 approaches and grips a cup or the like, an action of dropping the speed at which the arm portions 3002 close or stopping may be performed according to the computed force so that the cup is not broken.

Furthermore, in a case when moving the cop, in a case when there is rotation torque, an action of moving the cup to a different robot hand 3000 or the like may be performed. Further, at the initial stage, the contact sensor 12 may sense in full, and once it is determined that force is applied, the sensing of the contact sensor 12 may be stopped. The operation process of the size, the direction, the rotation torque, or the like of the force is then started by the force sensors 13 and the operation device 123. Further, the actions of the arm portions 3002 may be controlled by detecting the vibrations that are caused during the initial movement.

Modification 5

As described above, the force sensors are not limited to using force-sensitive elements such as force-sensitive rubber, and for example, may use a capacitance value changing type force-sensitive element. In such a case, when external force is acting, it is possible to detect the external force by sensing the change in the capacitance value. Further, the change in the inductance may be detected.

Modification 6

As described above, the electronic apparatus is not limited to the mobile phone 1000 or the mobile information terminal 2000, and for example, may be installed on a high-definition EVF (Electric View Finder), a digital camera, a digital video camera, a television, a vehicular apparatus, an audio apparatus, or the like.

This application claims priority to Japanese Patent Application No. 2010-273261 filed on Dec. 8, 2010. The entire disclosure of Japanese Patent Application No. 2010-273261 is hereby incorporated herein by reference.

What is claimed is:

1. A detection device comprising:
    a detection unit that includes a first sensor that is provided on a first substrate and which detects a presence of force and a force component separation mechanism that separates a size and a direction of the force, the direction of the force being determined by the non-uniform deformation of an elastic protrusion on a contact area of the force component separation mechanism; and
    a control unit that controls a detection action of the force component separation mechanism based on a detection result of the first sensor.

2. The device according to claim 1,
    wherein the force component separation mechanism including:
    a plurality of second sensors that detect a magnitude of force and that is arranged around a reference point on the first substrate; and
        an elastic protrusion that is provided on a second substrate that is arranged to face the first substrate and in which a front end portion abuts at a position that overlaps the reference point in plan view.

3. The device according to claim 2, wherein in a case when it is detected by the first sensor that there is force, the plurality of second sensors start detection of a force value by a signal from the control unit.

4. The device according to claim 1, wherein the first sensor is arranged between at least two force component separation mechanisms in plan view.

5. The device according to claim 1, wherein at least two force component separation mechanisms are arranged in surroundings of the first sensor in plan view.

6. The device according to claim 2, wherein the plurality of second sensors are arranged to be point symmetrical with respect to the reference point.

7. The device according to claim 2, wherein the plurality of second sensors are arranged in a matrix form in two directions that are orthogonal to each other in plan view.

8. The device according to claim 2, wherein the plurality of second sensors are arranged in at least four rows and four columns per unit detection region.

9. The device according to claim 3, wherein the first sensor includes a first electrode and a second electrode that are arranged to be opposed on the first substrate, the second sensor includes a third electrode and a fourth electrode that are arranged to be opposed on the first substrate, and a force-sensitive conductor is arranged between at least the third electrode and the fourth electrode.

10. The device according to claim 9, wherein an area in plan view of the first electrode of the first sensor is greater than an area in plan view of the third electrode of the second sensor.

11. A robot comprising the detection device according to claim 1.

12. A robot comprising the detection device according to claim 2.

13. A robot comprising the detection device according to claim 3.

14. A robot comprising the detection device according to claim 4.

15. A robot comprising the detection device according to claim 5.

16. A robot comprising the detection device according to claim 6.

17. A robot comprising the detection device according to claim 7.

18. A robot comprising the detection device according to claim 8.

19. A robot comprising the detection device according to claim 9.

20. A electronic apparatus comprising the detection device according to claim 1.

* * * * *